(12) United States Patent
Manchi

(10) Patent No.: US 8,907,973 B2
(45) Date of Patent: Dec. 9, 2014

(54) CONTENT ADAPTIVE IMAGE RESTORATION, SCALING AND ENHANCEMENT FOR HIGH DEFINITION DISPLAY

(71) Applicant: STMicroelectronics International N.V., Amsterdam (NL)

(72) Inventor: Chandranath Manchi, Karnataka (IN)

(73) Assignee: STMicroelectronics International N.V., Amsterdam (NL)

( * ) Notice: Subject to any disclaimer, the term of this patent is extended or adjusted under 35 U.S.C. 154(b) by 236 days.

(21) Appl. No.: 13/656,869

(22) Filed: Oct. 22, 2012

(65) Prior Publication Data

US 2014/0111532 A1    Apr. 24, 2014

(51) Int. Cl.

| | | |
|---|---|---|
| G09G 5/00 | (2006.01) | |
| G09G 5/02 | (2006.01) | |
| G06T 15/60 | (2006.01) | |
| G06T 17/00 | (2006.01) | |
| H04N 7/12 | (2006.01) | |
| H04N 5/00 | (2011.01) | |
| H04N 5/52 | (2006.01) | |
| H04B 1/10 | (2006.01) | |
| G06K 9/40 | (2006.01) | |
| G06K 9/36 | (2006.01) | |
| G06K 9/32 | (2006.01) | |
| G06F 15/00 | (2006.01) | |
| G06F 17/10 | (2006.01) | |
| G06F 11/00 | (2006.01) | |

(52) U.S. Cl.
USPC ........... 345/589; 345/426; 345/428; 345/582; 345/616; 345/606; 348/425.2; 348/607; 348/683; 375/240.27; 375/254; 382/252; 382/274; 382/276; 382/300; 382/263; 708/208; 708/315; 708/530

(58) Field of Classification Search
USPC ................. 345/418, 426, 428, 581–582, 586, 345/615–618, 606, 660, 510, 555; 348/384.1, 425.2, 552, 606–607, 609, 348/622, 666–667, 683; 375/240.27, 375/240.29, 242–243, 254; 382/232, 252, 382/254, 260–265, 274, 276, 298, 300, 305, 382/307; 708/208, 290, 200, 300, 315, 490, 708/505, 530, 620, 819
See application file for complete search history.

(56) References Cited

U.S. PATENT DOCUMENTS

| | | | | |
|---|---|---|---|---|
| 4,682,251 | A * | 7/1987 | Hirota et al. ................... | 386/269 |
| 5,835,237 | A * | 11/1998 | Ebrahimi ....................... | 358/448 |
| 7,119,853 | B1 * | 10/2006 | Westerman .................... | 348/607 |
| 7,321,699 | B2 * | 1/2008 | Johnson et al. ................ | 382/254 |
| 7,868,950 | B1 * | 1/2011 | Samadani et al. ............. | 348/609 |
| 2008/0095433 | A1 * | 4/2008 | Johnson et al. ............... | 382/169 |
| 2010/0290716 | A1 * | 11/2010 | Mori et al. ..................... | 382/309 |

* cited by examiner

Primary Examiner — Wesner Sajous
(74) Attorney, Agent, or Firm — Gardere Wynne Sewell LLP

(57) ABSTRACT

An image processor includes generates a content adaptive kernel from an image block with noise of a luminance component signal with a low resolution. The content adaptive kernel is convolved with the luminance component signal. A noise signal and an extracted texture which excludes noise are generated. The luminance component signal is filtered as function of the noise signal to generate an enhanced luminance component signal. Horizontal and vertical scaling is performed on the enhanced luminance component signal, the extracted texture, and the luminance component signal, with the luminance component signal adaptively scaled as a function of the extracted texture. The horizontally and vertically scaled enhanced luminance component signal, extracted texture and luminance component signal are then combined to generate an output luminance component signal with a high resolution.

21 Claims, 21 Drawing Sheets

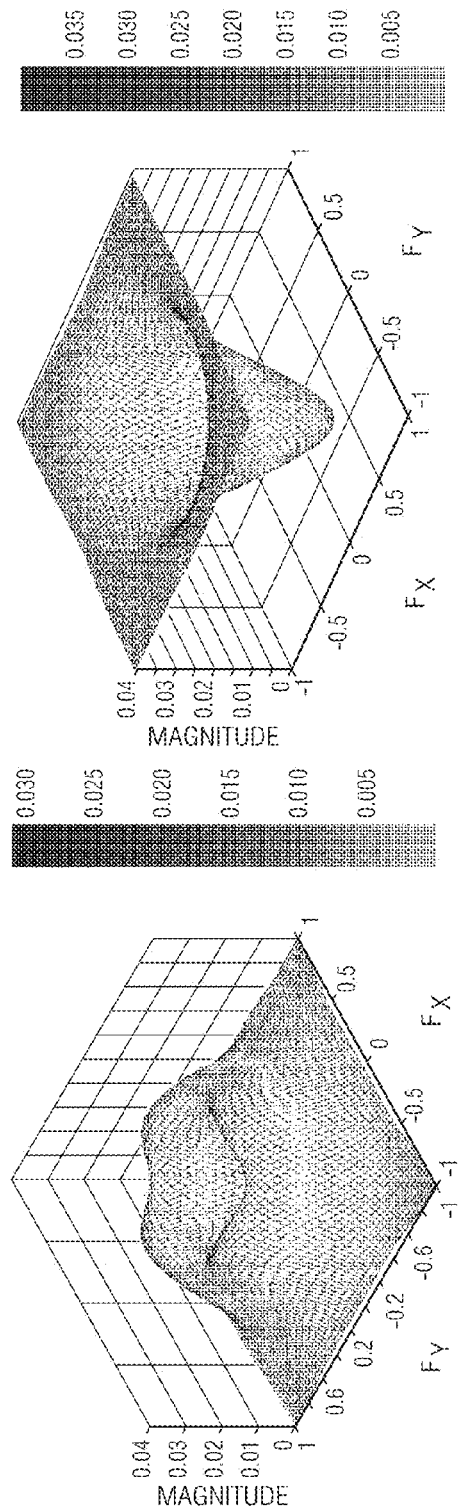
FIG. 12B
FIG. 12A
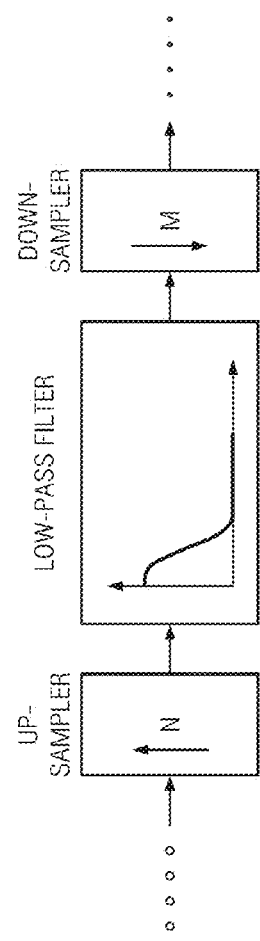
FIG. 13

| PHASE | 0<br>c0 | 1<br>c1 | 2<br>c2 | 3<br>c3 | 4<br>c4 | 5<br>c5 | 6<br>c6 | 7<br>c7 | 8<br>c8 | 9<br>c9 | 10<br>c10 | 11<br>c11 | 12<br>c12 | 13<br>c13 | 14<br>c14 | 15<br>c15 | ... | 24<br>c24 | 25<br>c25 | 26<br>c26 | 27<br>c27 | 28<br>c28 | 29<br>c29 | 30<br>c30 | 31<br>c31 |
|---|---|---|---|---|---|---|---|---|---|---|---|---|---|---|---|---|---|---|---|---|---|---|---|---|---|
| 0 | A | 0 | 0 | 0 | 0 | 0 | 0 | 0 | B | 0 | 0 | 0 | 0 | 0 | 0 | 0 | ... | D | 0 | 0 | 0 | 0 | 0 | 0 | 0 |
| 1 | 0 | A | 0 | 0 | 0 | 0 | 0 | 0 | 0 | B | 0 | 0 | 0 | 0 | 0 | 0 | ... | 0 | D | 0 | 0 | 0 | 0 | 0 | 0 |
| 2 | 0 | 0 | A | 0 | 0 | 0 | 0 | 0 | 0 | 0 | B | 0 | 0 | 0 | 0 | 0 | ... | 0 | 0 | D | 0 | 0 | 0 | 0 | 0 |
| 3 | 0 | 0 | 0 | A | 0 | 0 | 0 | 0 | 0 | 0 | 0 | B | 0 | 0 | 0 | 0 | ... | 0 | 0 | 0 | D | 0 | 0 | 0 | 0 |
| 4 | 0 | 0 | 0 | 0 | A | 0 | 0 | 0 | 0 | 0 | 0 | 0 | B | 0 | 0 | 0 | ... | 0 | 0 | 0 | 0 | D | 0 | 0 | 0 |
| 5 | 0 | 0 | 0 | 0 | 0 | A | 0 | 0 | 0 | 0 | 0 | 0 | 0 | B | 0 | 0 | ... | 0 | 0 | 0 | 0 | 0 | D | 0 | 0 |
| 6 | 0 | 0 | 0 | 0 | 0 | 0 | A | 0 | 0 | 0 | 0 | 0 | 0 | 0 | B | 0 | ... | 0 | 0 | 0 | 0 | 0 | 0 | D | 0 |
| 7 | 0 | 0 | 0 | 0 | 0 | 0 | 0 | A | 0 | 0 | 0 | 0 | 0 | 0 | 0 | B | ... | 0 | 0 | 0 | 0 | 0 | 0 | 0 | D |

*FIG. 15B*

CONTENT ADAPTIVE IMAGE RESTORATION, SCALING AND ENHANCEMENT FOR HIGH DEFINITION DISPLAY

TECHNICAL FIELD

The present invention relates to image processing and, in particular, to the processing of images for high definition display by implementing adaptation for noise and texture.

BACKGROUND

Display technology is growing at tremendous rate. Image processing has shifted from analog processing to digital processing and high definition display panels are now the most commonly used technology in present day television sets. However, low resolution video content must continue to be supported and a desire exists to display such content on high resolution displays. There is accordingly a demand for effective image processing solutions that can display low resolution video with high clarity and quality. Consumers desire the display of low resolution video content in a manner perceived equal with respect to high resolution video content.

Reference is now made to FIG. 1 which illustrates a block diagram of a conventional image restoration and enhancement system 10. The system 10 includes a low resolution (standard definition) processing domain 12 and a high resolution (high definition) processing domain 14.

In the low resolution processing domain 12, a low resolution (raw) video signal 16 is received by a pre-scaler domain image restoration block 42 which performs a noise reduction 18 operation. Thus, image restoration in the pre-scaler domain signal processing, known to those skilled in the art, is performed on the low resolution video signal 16.

The noise cleaned low resolution signal 20 output from the pre-scaled domain image restoration block 18 is then processed by a scaling with enhancement block for conversion into a high resolution video signal 32. The scaling with enhancement block comprises two stages: a first stage 40 formed by a vertical scaling and sharpness block 22 and a second stage 44 formed by a horizontal scaling and sharpness block 30. The vertical scaling and sharpness block 22 functions based on polyphase filtering. The system 10 further includes a look-up table 26 for storing polyphase filter coefficients for the block 22. The vertical scaling and sharpness block 22 also includes a line memory bank block 28 which comprises a memory for storing video data in connection with the vertical scaling and sharpness polyphase filter processing. Operation of the vertical scaling and sharpness block 22 is known to those skilled in the art. The vertically processed video signal 24 output from the block 22 is then processed by the horizontal scaling and sharpness block 30 for conversion into the high resolution video scaled output signal 32. The horizontal scaling and sharpness block 30 functions based on polyphase filtering. The system 10 further includes a look-up table 34 for storing the polyphase filter coefficients for the block 30. Vertical scaling with sharpness block 40 and horizontal scaling with sharpness block 44 processing exist as separate instances for the luma and chroma paths.

In the high resolution processing domain 14, the high resolution video signal 32 is received by a post-scaler edge domain image enhancement block 46 which performs an edge enhancement and detail sharpness 36 operation to produce a high resolution processed video output 38. Post scalar domain image enhancement 46 is performed only on the luma from the scalar block. Scaled chroma is delayed to match with the post scalar luma processing. Thus, image enhancement in the post-scaler domain signal processing, known to those skilled in the art, is performed on the high resolution video signal 32. The image enhancement block 46 also includes a line memory bank block 48 which comprises a memory for storing luminance data for the 2D processing in the post scalar domain. 2D luminance data in the post scalar domain mainly involves fine texture sharpness and edge enhancement processing.

The performance and results of the system 10 are unacceptable for a number of reasons including:

1. The pre-scaler domain image restoration block 42 implicates noise reduction prior to image scaling. This operation can lead to a loss of fine textures and detail loss due to poor performance, and these losses are irreversible. Poor adaptation to texture and noise can lead to loss of texture during the process of noise reduction.

2. The vertical and horizontal scaling filters in blocks 22 and 30 are designed to scale the image into the high resolution domain with a single wide band polyphase filter. The scaling weights common for noise and texture region assumes that the image restoration is fool proof. However, any stray remnants of noise present after restoration can be scaled into the high resolution domain, and these remnants cannot be removed in the post scaled domain; rather, post scaled domain image restoration is a costly solution.

3. The vertical and horizontal sharpness which are embedded with the scaling filter can also enhance the stray remnants of noise removed in the restoration block. Typically, the noise cleaned region should not be sharpened during image enhancement. Further, in design, separable vertical and horizontal one dimension sharpness is applied. This can lead to jaggedness in the slant edges amplified by the sharpness.

4. Image enhancement is performed over entire image irrespective of whether the edge is in the noisy region or in the texture region. This can lead to stray noise in the shapes of textures in the post scaled domain. Normally any edge enhancement for the noise cleaned region should be switched off.

A need thus exists in the art for an improved image processing system which supports the conversion of low resolution video for high resolution display using an adaptive approach.

SUMMARY

It is noted that for all stages of prior art image restoration, scaling and enhancement processing does not give importance to the noise and texture or any kind of adaptation for the nature of the low resolution signal. The effectiveness of every block can thus be hampered by the inefficiency in adapting to the content and nature of the input video.

A content adaptive resolution enhancer (CARE) addresses this and other issues by providing an adaptive control which is derived from the importance of the incoming video signals. All the pre-scaled image processing, post-scaled image processing and resolution up conversion (scaling) are adaptively processed using adaptive control.

In an embodiment, an image processing system comprises: a texture estimator and noise discriminator configured to receive a luminance component signal with a low resolution and comprising an image block with noise, generate a content adaptive kernel from the image block, convolve the adaptive kernel with the luminance component signal, and generate a noise signal and an extracted texture which excludes noise; a two-dimensional adaptive sharpener configured to receive the luminance component signal and the noise signal, filter the luminance component signal as a function of the noise signal, and generate an enhanced luminance component signal; a scaler configured to horizontally and vertically scale the enhanced luminance component signal, horizontally and vertically scale the extracted texture, and adaptively vertically and horizontally scale the luminance component signal as a function of the horizontally and vertically scaled extracted texture; and an image enhancer configured combine the horizontally and vertically scaled enhanced luminance component signal, horizontally and vertically scaled extracted texture and adaptively vertically and horizontally scaled luminance component signal to generate an output luminance component signal with a high resolution.

BRIEF DESCRIPTION OF THE DRAWINGS

For a better understanding of the embodiments, reference will now be made by way of example only to the accompanying figures in which:

FIGS. 4-9 illustrate a process for noise and texture discrimination;

FIGS. 12A and 12B illustrating filtering characteristics;

FIG. 13 illustrates a scaling operation;

FIGS. 15A and 15B concern the exemplary implementation of a four tap eight phase polyphase FIR scaling block operable for scaling data;

DETAILED DESCRIPTION OF THE DRAWINGS

Figure 1:
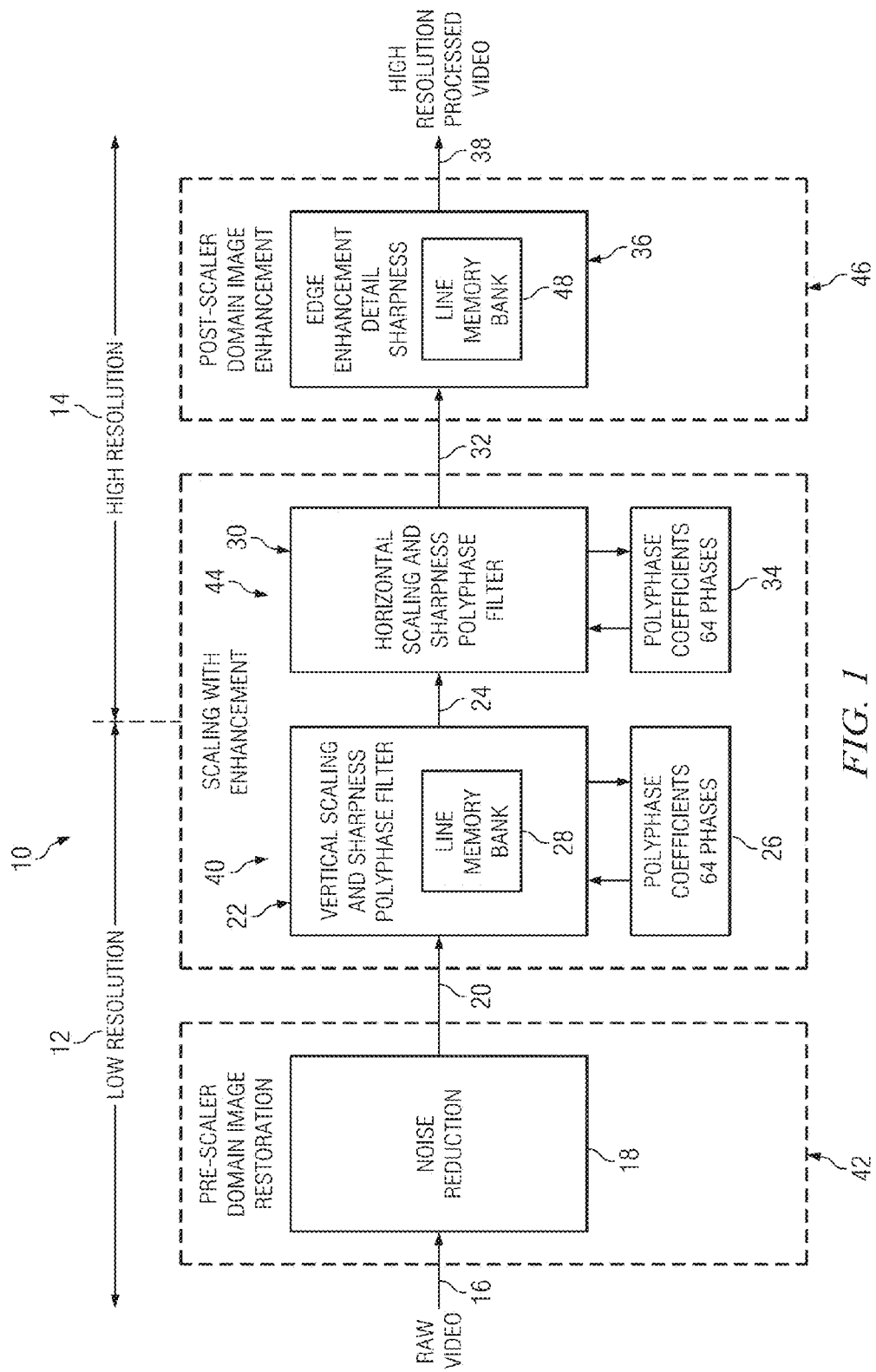
FIG. 1 is a block diagram of a conventional image restoration and enhancement system.
Figure 2:
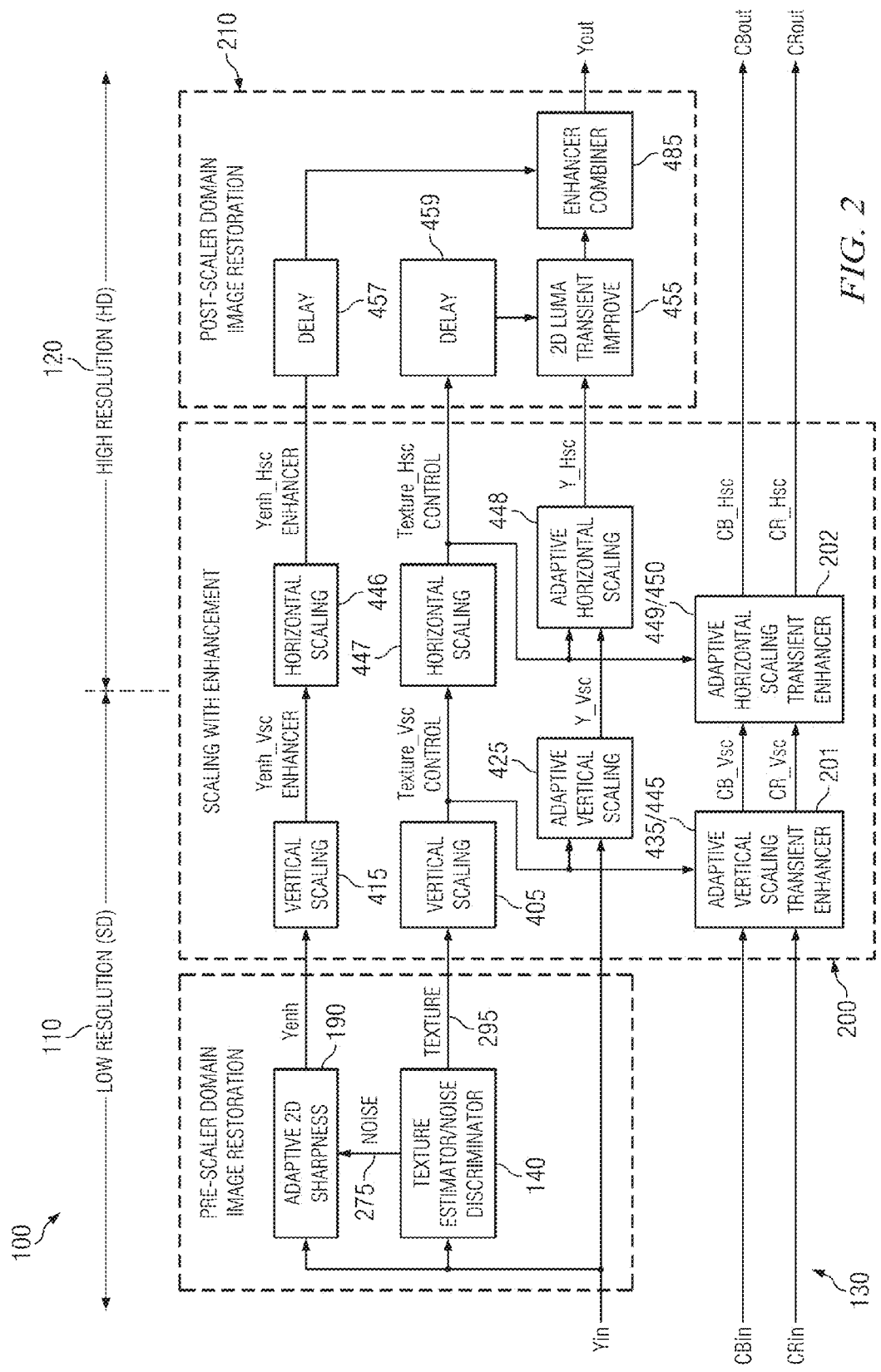
FIG. 2 is a block diagram of a content adaptive image restoration and enhancement system.

Reference is now made to FIG. 2 which shows a block diagram of a content adaptive image restoration and enhancement system 100. The system 100 includes a low resolution, for example, standard definition (SD), processing domain 110 and a high resolution, for example, high definition (HD), processing domain 120. A low resolution video signal 130 is received in the well known YCbCr format wherein Y is the luminance component, and Cb (CBin) and Cr (CRin) are the chroma components.

A texture estimator and noise discriminator block 140 receives the input Y luminance component (Yin). The texture estimator and noise discriminator block 140 functions to receive an image block with noise and generate a content adaptive kernel. The adaptively shaped kernel is convolved with the incoming noisy signal to output an extracted texture which excludes noise. More specifically, the following functions are performed: texture validity is estimated by spatial correlation of the pixel with its surrounding pixels; a measurement of uncorrelated pixels and variance gives an amount of noise locally existing on the texture; a traditional detail extraction kernel, such as Isotropic Gaussian mask, is reshaped based on the texture correlation to content adaptive anisotropic kernel; and the raw image is filtered with the content adaptive kernel to give valid texture details excluding noisy information that are uncorrelated within a spatial search window.

Figure 3:
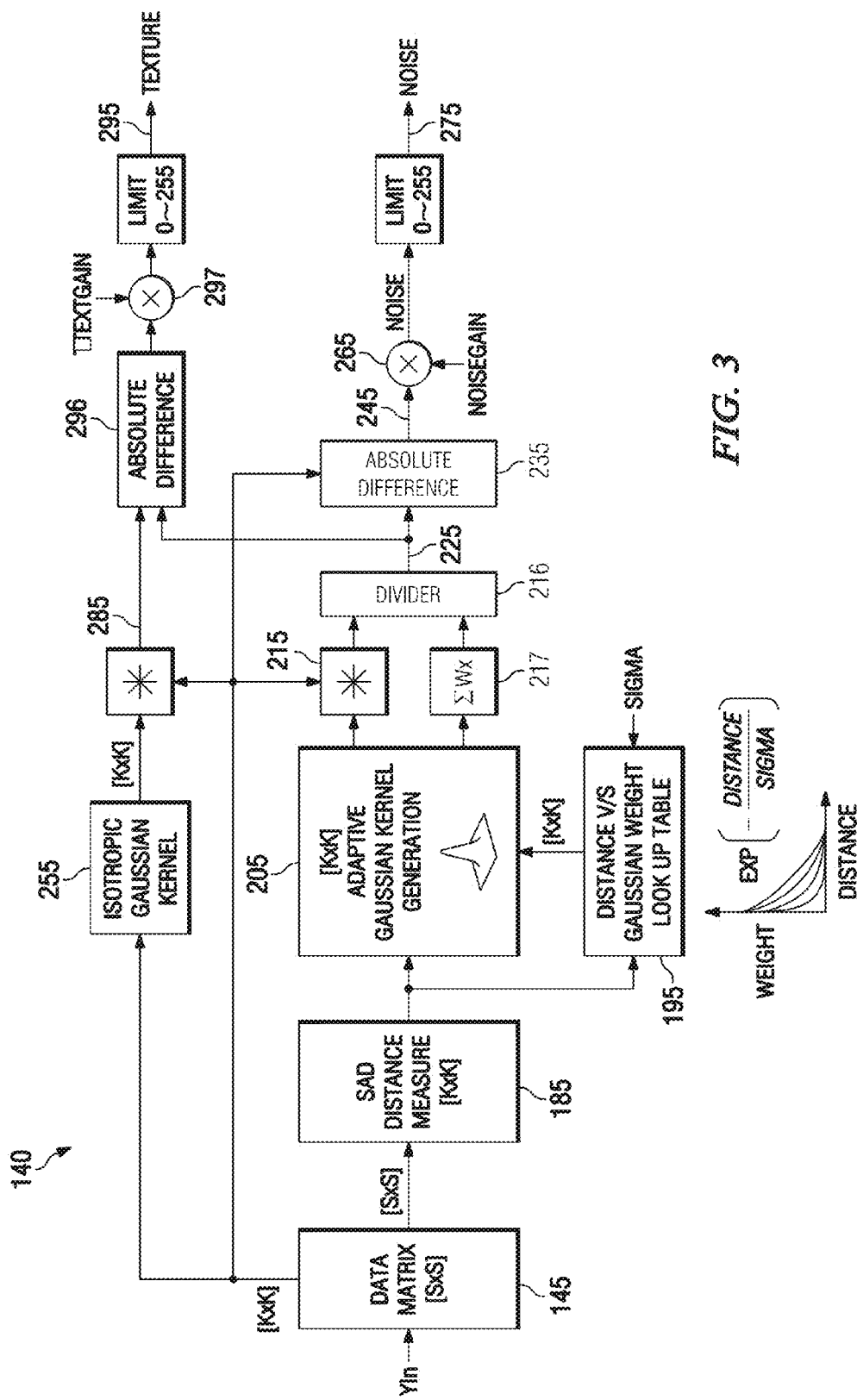
FIG. 3 is a block diagram of a texture estimator and noise discriminator block within the content adaptive image restoration and enhancement system of FIG. 2.

Reference is now made to FIG. 3 which illustrates a block diagram of the texture estimator and noise discriminator block 140 within the content adaptive image restoration and enhancement system 100 of FIG. 2, and to FIGS. 4-9 which illustrate the process for noise and texture discrimination. The texture estimator and noise discriminator block 140 receives the input Y luminance component (Yin). The input Y luminance component (Yin) is passed to a data matrix 145.

Figure 4:
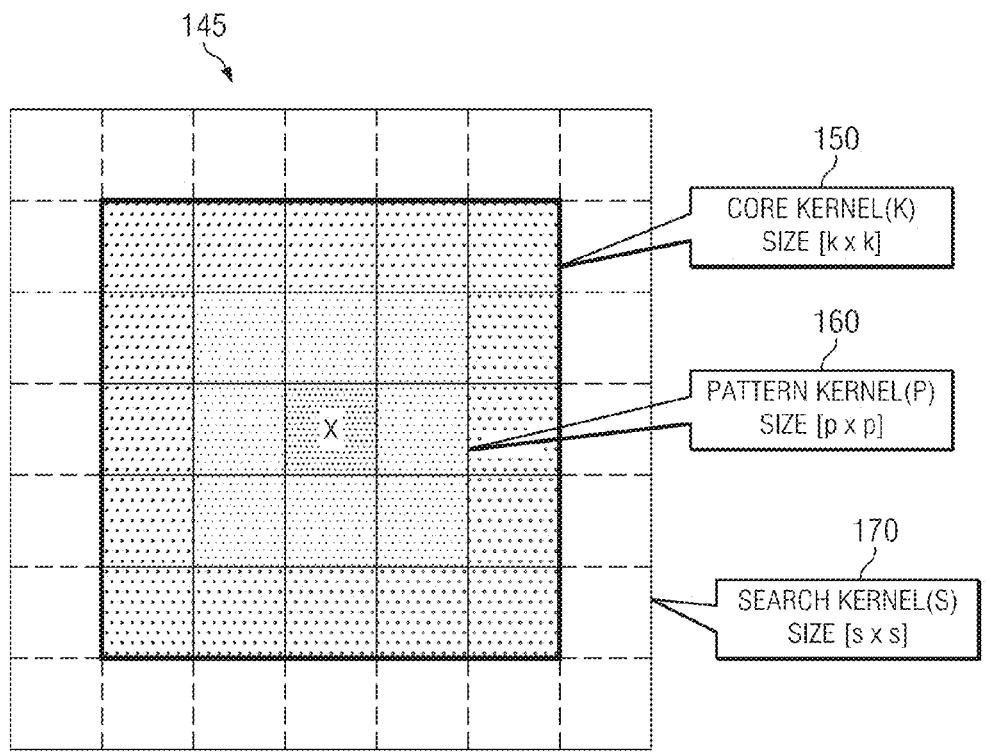

FIG. 4 illustrates the data matrix 145. For a given pixel X, a core kernel window 150 is formed that is centered on pixel X. The core kernel window 150 is referenced as K. The size of core kernel K is k×k, wherein the size k is decided based on the noise tolerance support and the sustainable hardware cost. The lowest window size starts at k=3 and is preferably an odd number. In the embodiment shown, k=5 for a core kernel window 150 of size 5×5. For the given pixel X, a pattern window 160 is formed centered on pixel X. The pattern window 160 is referenced as P. The size of the pattern window P is p×p, where p<k. The value of k increases with the amount of noise discrimination needed for the system. To support a low noise image with SNR 50 dB and above, a pattern window 150 of size p=3 can be used. To support a high noise image with SNR above 30 dB, a pattern window of size p=7 or higher can be used. For the given pixel X, a search window 170 is formed centered on pixel X. The search window 170 is referenced as S. The search window 170 encompasses the entire content searching window for pattern matching. The size of the search window 170 is s×s, where s>k (for example, s=k+(p/2)+1).

Figure 5:
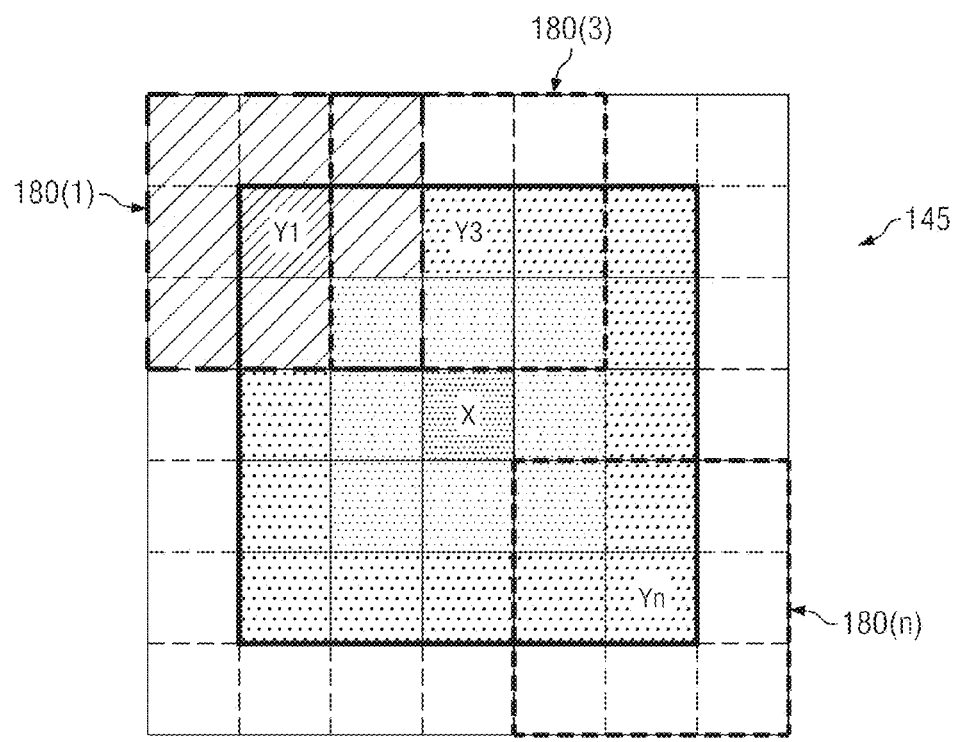
Figure 6A:
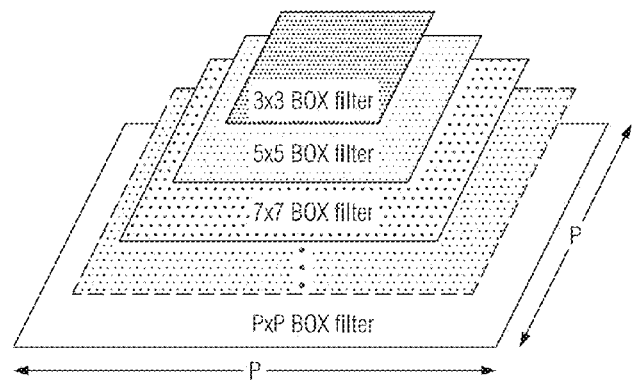
Figure 6B:
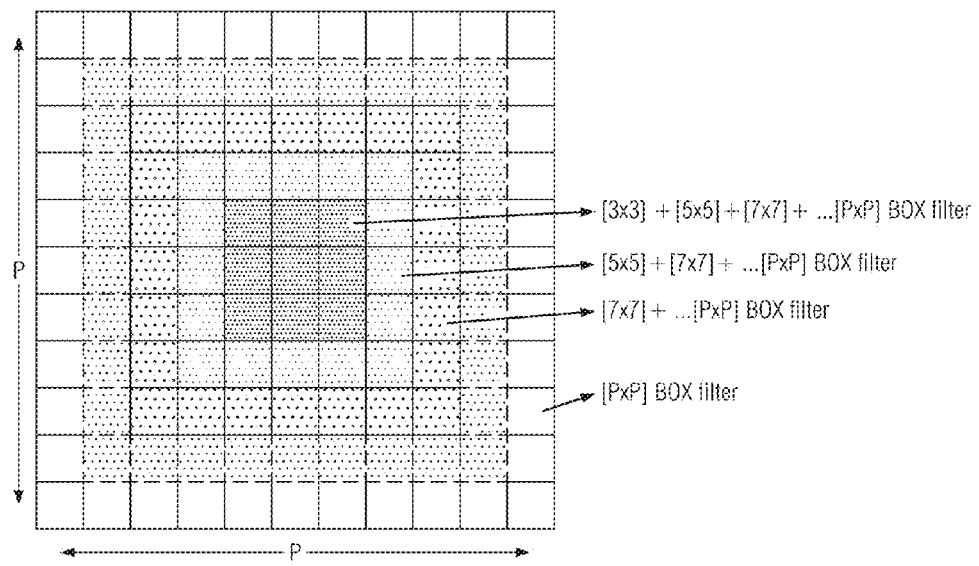
Figure 7:
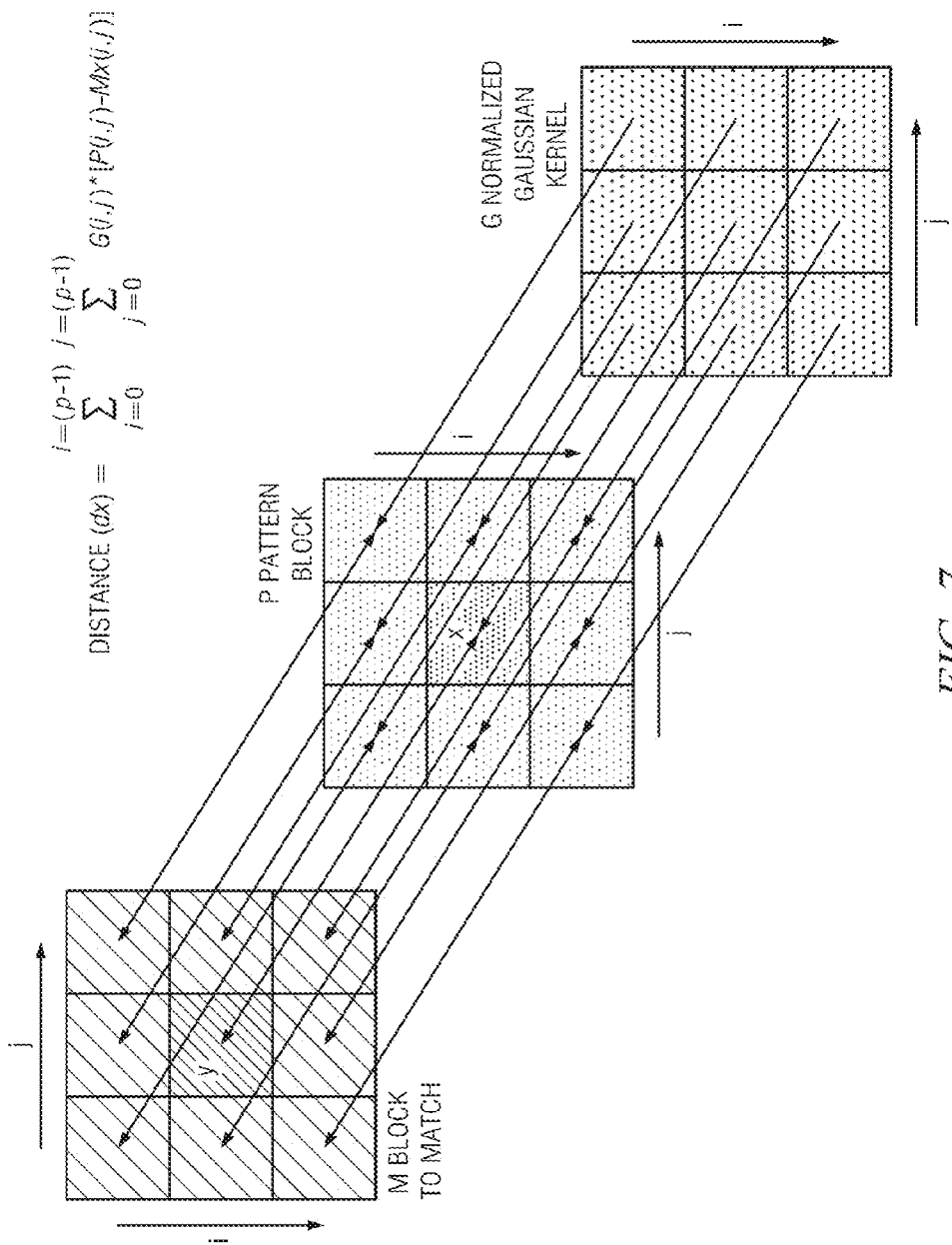

With reference now to FIG. 5, within the data matrix 145 a pixel Y is a given one of the Yn pixels included in the core kernel window 150 (but not including pixel X). For each pixel Y, a matching block 180 is formed that is centered on that pixel Y, wherein the matching blocks 180 are referenced as Mi below. The matching block 180 is of the same size p×p as the pattern window 160. The matching blocks 180(1), 18(3) and 180(n) are shown for the pixels Y1, Y3 and Yn, respectively, as examples FIG. 3 shows that the data matrix 145 is processed by a sum of absolute difference (SAD) based distance measurement block 185. Each matching block Mi 180(1) to 180(n) (i.e., Mi for i=Y1 to Yn) is individually matched to the pattern window 160 centered on pixel X. The matching operation between P and Mi comprises a computation of a difference. This difference is based on the Gaussian weighted sum of absolute differences (GWSAD) which is termed as a distance between the two windows as shown below:

$$\text{Distance}(dx) = \sum_{i=0}^{i=(p-1)} \sum_{j=0}^{j=(p-1)} G(i,j) * [P(i,j) - Mx(i,j)]$$

wherein: x is index for the matching blocks $180(1)$ to $180(n)$ within the search window, and $G(i,j)$ is the Gaussian kernel that is approximated for the unity gain of the size equal to the pattern window. Kernel G is generated by summation of all the BOX filters from the maximum size [P×P] to the minimum size [3×3] which are aligned with the center pixel. The process is illustrated in FIGS. 6 and 7.

The Gaussian weighted sum of absolute difference distance for every pixel y (for y=Y1–Yn) to pixel X is calculated. Thus, a total of n Gaussian weighted sum of absolute difference distance calculations are made and a total of n distance results are produced.

The n Gaussian weighted sum of absolute difference distance calculations are then processed to define an equivalent Gaussian weight, with this weight stored in a look-up table 195. The weight for the look-up table 195 is computed from the distance $d(x,y) \Rightarrow w(x,y)$; wherein $w(x,y)=\exp(-d(x,y)/\text{SIGMA})$. The weight is given by a decreasing function of the distance. Highly correlated matching windows or those with a lower distance from the pattern window are assigned higher weights. Less correlated matching windows or those with a large distance from the pattern window are assigned lesser weights. The parameter SIGMA measures the degree of filtering of the obtained image. The value of SIGMA will depend on the standard deviation of the noise sigma σ (i.e., SIGMA=Aσ, wherein A is a constant characterized based on the core kernel window size k. For smaller size k, then A≈k. The required set of weight to distance plots for values of SIGMA are stored in a look-up table 195 which is addressed by the input SIGMA.

Figures 8, 9:
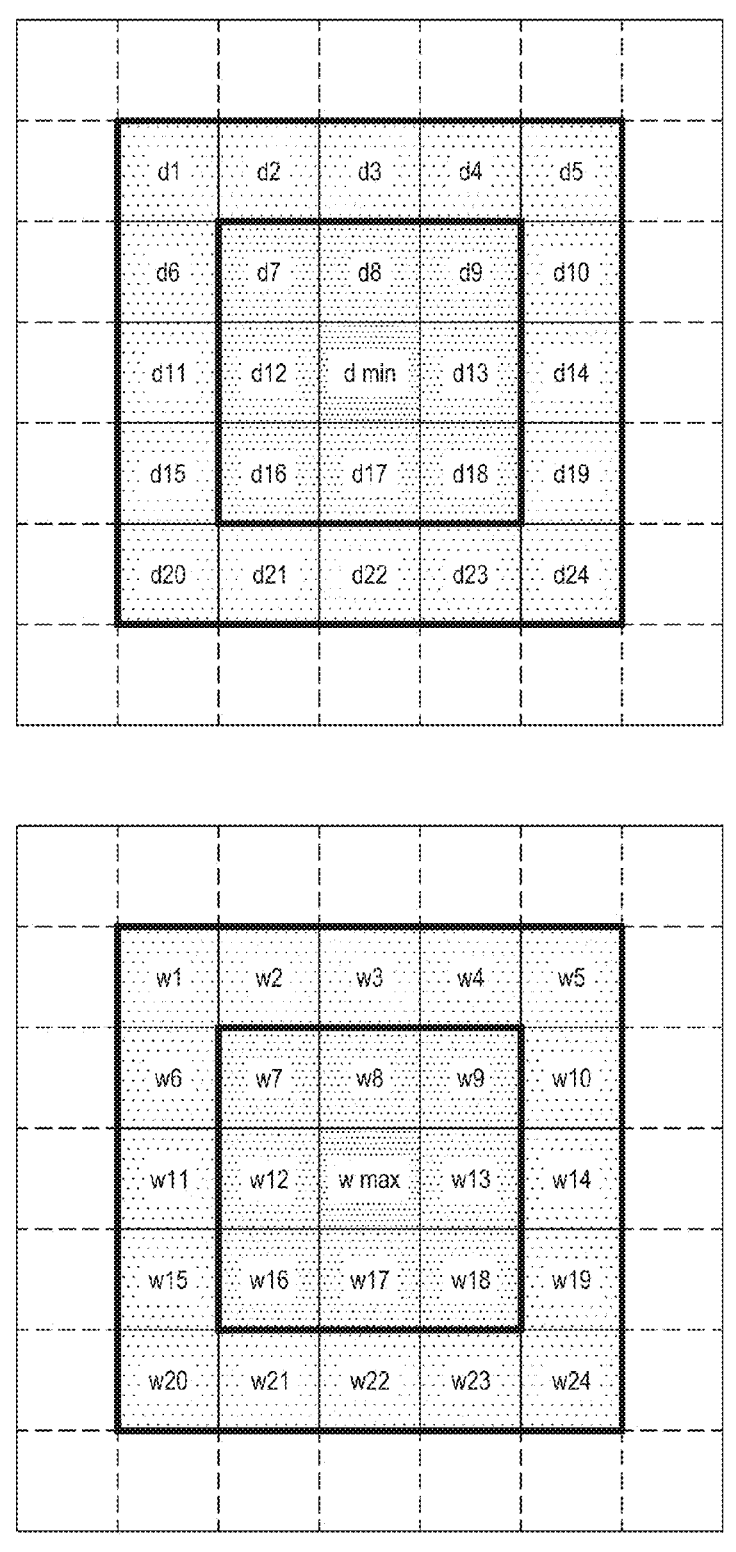

In the SAD based distance measurement block 185, the distance value for the center pixel 220 is replaced by the minimum distance found among all the distances in the core kernel except the center distance. So, the distance of the center pixel 'x' will be replaced by the calculated minimum distance among all of the pixels y=Y1–Yn (i.e., the distance for the center pixel X is dx=dmin=min(d1, d2, ... dn). This is shown in FIG. 8.

An adaptive Gaussian kernel generation block 205 receives the n Gaussian weighted sum of absolute difference distance calculations from the SAD based distance measurement block 185 and the n distance versus Gaussian weight calculations from storage in the look-up table 195. Hence, a weight matrix of size k×k is derived from the distance matrix of size p×p given by the distance measurement block 185.

Within every weight matrix, the weight of the center pixel X is always the maximum weight (Wmax) among the weight matrix W(x,y).

Thus, a neighborhood weighted anisotropic Gaussian mask is computed in the adaptive Gaussian kernel generation block 205. This is shown in FIG. 9.

Figure 10:
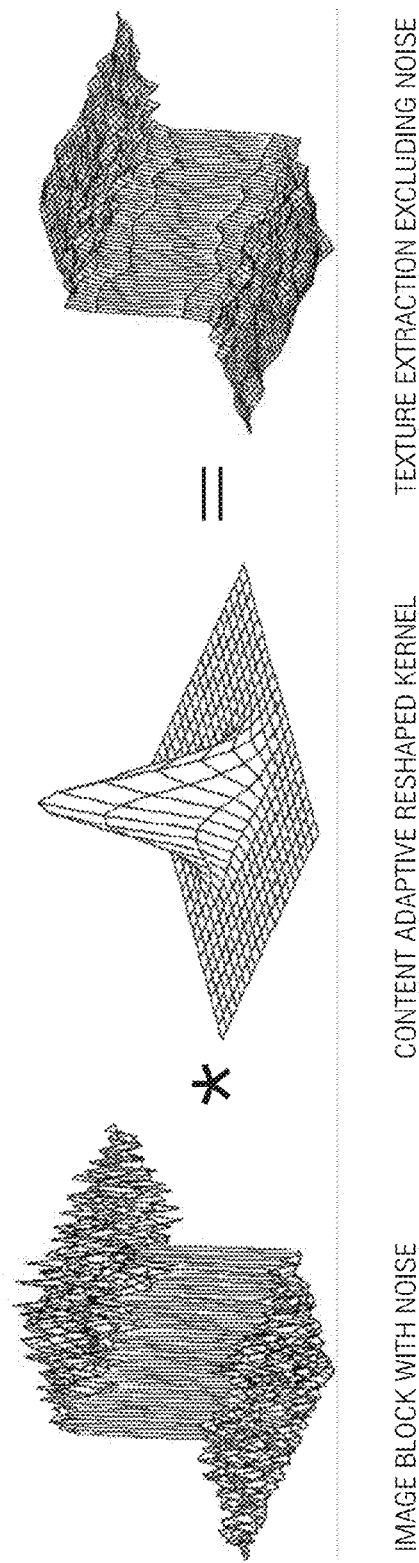
FIG. 10 illustrates an operation for filtering a raw image of the content adaptive reshaped kernel to produce a texture extraction excluding noise.

Reference is now once again made to FIG. 3. Sum of all the weights in the adaptive weight matrix from the system 205 is calculated by the total weight measurement block 217. Filter output from the convolution block 215 is normalized by dividing the filter output by the sum of all the weights of the adaptive filter mask calculated in the block 217. The neighborhood weighted anisotropic Gaussian mask (a content adaptive reshaped kernel) of size k×k (core kernel size) is then convolved with the Y luminance data of the size k×k from data matrix 145 in a convolution block 215. The effect of this operation is to extract the clean texture component 225 from the input Y luminance component (Yin) and exclude noise as shown in FIG. 10.

A differencing block 235 calculates an absolute difference between the input raw Y luminance component (Yin) from data matrix 145 and the clean Y luminance texture component 225. This difference 245 is represented as noise which is nothing but the signal strength excluding the clean texture details (i.e., the clean Y luminance texture component 225) in the raw Y luminance input. The difference 245 is multiplied 265 by a gain factor (NOISEGAIN) to boost the noise level to a required range (which is limited, for example, 0 to 255 in 8-bit control width) and provide noise output 275.

The input Y luminance component data (Yin) from data matrix 145 is also convolved with an isotropic fixed kernel 255 (obtained from the input Y luminance component data) to obtain a highly smooth luminance 285. A difference block 296 calculates an absolute difference between the clean Y luminance texture component 225 and the smooth luminance 285 so as to provide the difference between the correlated and non-correlated texture. The output from block 296 is the texture information that can be boosted by multiplication 297 with a gain factor (TEXTGAIN). Finally, the boosted texture is limited to the 8-bit control width to produce texture output 295.

Figure 11:
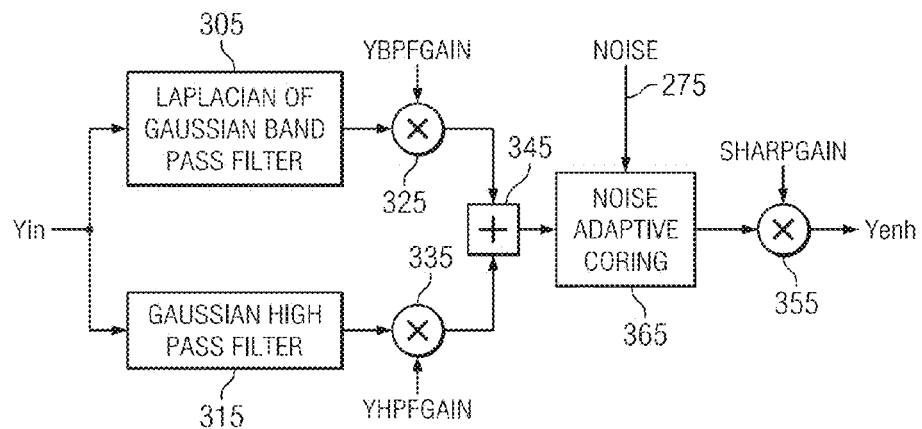
FIG. 11 is a block diagram of an adaptive 2D sharpness block within the content adaptive image restoration and enhancement system of FIG. 2.
Figure 11A:
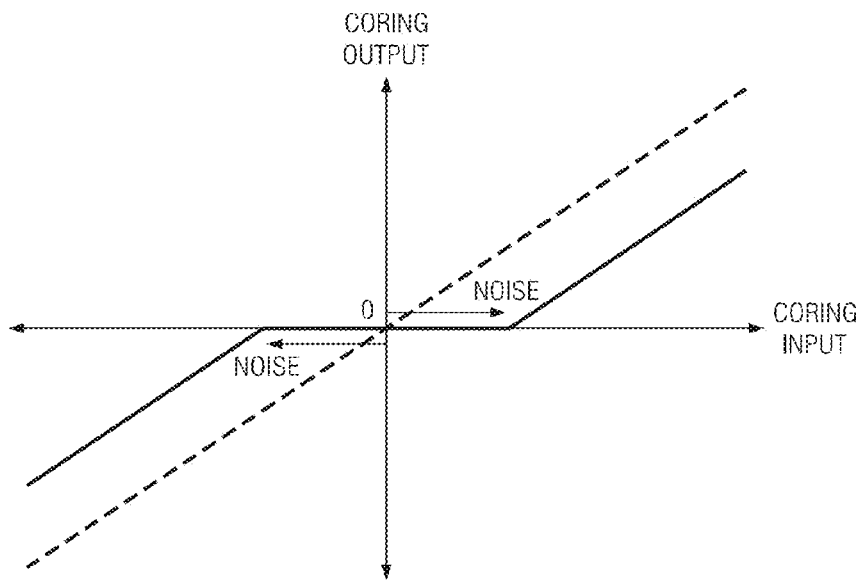
FIG. 11A illustrates a noise coring function.

Referring back to FIG. 2, an adaptive pre-scaled domain 2D adaptive sharpness block 190 receives the input Y luminance component (Yin) and the noise output 275 and produces an enhanced Y luminance component (Yenh). FIG. 11 illustrates a block diagram of the adaptive pre-scaled domain 2D adaptive sharpness block 190 within the content adaptive image restoration and enhancement system 100 of FIG. 2. The received input Y luminance component (Yin) is processed by a first filter 305 and a second filter 315. The first filter 305 is a 2D band-pass filter with the Lapacian of the Gaussian kernel. An exemplary shape of the filtering operation performed by the first filter 305 is shown in FIG. 12A. The second filter 315 is a Gaussian high-pass filter. An exemplary shape of the filtering operation performed by the second filter 315 is shown in FIG. 12B. A band-pass filtered luminance output from the first filter 305 is multiplied 325 by band-pass gain factor (YBPFGAIN), and a high-pass filtered luminance output from the second filter 315 is multiplied 335 by high-pass gain factor (YHPFGAIN). The gain adjusted filtered luminance outputs are then summed 345 together and passed through a noise adaptive coring block 365 which prevents any noise from being enhanced. A noise cored 2D sharpness filter is applied by the noise adaptive coring block 365 as a function of the noise output 275. Noise coring is done by subtraction of noise from the filter output as shown in FIG. 11A. The filtered output of the noise adaptive coring block 365 is multiplied 355 by a sharpness gain factor (SHARPGAIN) to produce an enhanced Y luminance component (Yenh).

With continued reference to FIG. 2, an adaptive polyphase FIR scaling with enhancement block 200 receives the enhanced Y luminance component (Yenh), the input luminance component Yin, the output texture 295 and the input chroma components (CBin and CRin). The adaptive polyphase FIR scaling block 200 functions to scale the image information by N/M times. This scaling operation comprises first interpolating the signal by a factor of N. This may be accomplished by inserting N zeros between pairs of samples, low pass filtering, and then down sampling by a factor of M. This is generally illustrated in FIG. 13.

More specifically, the adaptive polyphase FIR scaling block 200 implements a multi-tap multi-phase polyphase finite impulse response (FIR) filtering operation on the data for each of the enhanced Y luminance component (Yenh), the input Y luminance component (Yin), the output signal texture 295 and the chroma components (CBin and CRin).

Figure 14:
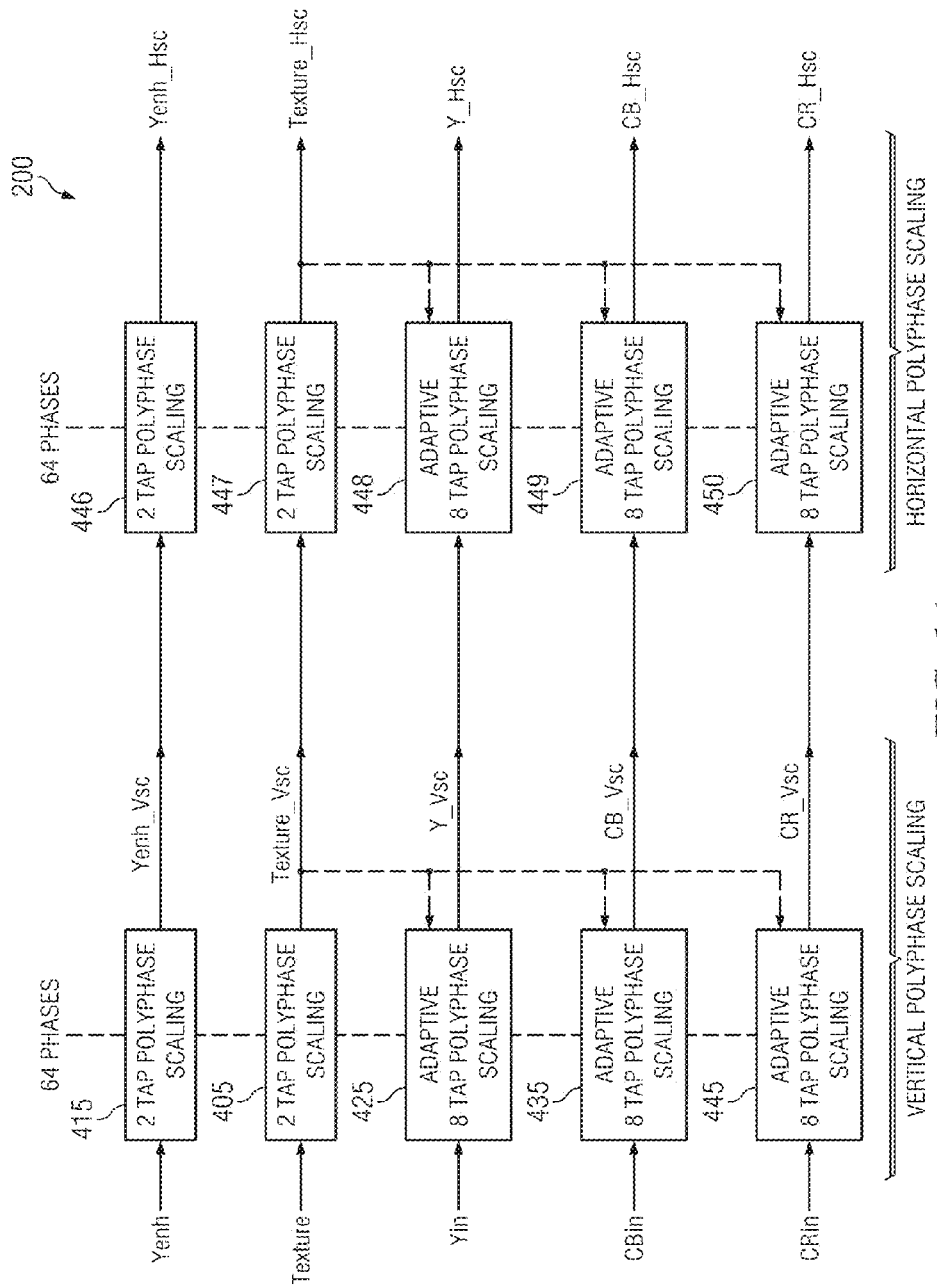
FIG. 14 is a block diagram of an adaptive polyphase FIR scaling with enhancement block within the content adaptive image restoration and enhancement system of FIG. 2.

FIG. 14 shows a block diagram of the adaptive polyphase FIR scaling block 200. With respect to the output signal texture 295, a two tap polyphase scaling block 405 produces a vertically scaled texture output (Texture_Vsc) comprising control signaling. With respect to the enhanced Y luminance component (Yenh), a two tap polyphase scaling block 415 produces a vertically scaled enhanced Y luminance component (Yenh_Vsc) comprising enhancer signaling. With respect to the input Y luminance component (Yin), an eight tap polyphase scaling block 425 produces a vertically scaled input Y luminance component (Y_Vsc). With respect to the input chroma component (CBin), an eight tap polyphase scaling block 435 produces a vertically scaled chroma component (CB_Vsc). With respect to the input chroma component (CRin), an eight tap polyphase scaling block 445 produces a vertically scaled chroma component (CR_Vsc). The vertically scaled texture output (Texture_Vsc) is further applied as an input to the eight tap polyphase scaling block 425, the eight tap polyphase scaling block 435 and the eight tap polyphase scaling block 445. The vertically scaled texture output (Texture_Vsc) accordingly functions as a control signal for selecting the filter set applied by the polyphase scaling blocks 425, 435 and 445. This is discussed below in connection with FIG. 15E.

With respect to the output signal Texture_Vsc (control signaling), a two tap polyphase scaling block 447 produces a horizontally scaled Texture output (Texture_Hsc) comprising control signaling. With respect to the vertically scaled enhanced Y luminance component (Yenh_Vsc), a two tap polyphase scaling block 446 produces a horizontally scaled enhanced Y luminance component (Yenh_HSc) comprising enhancer signaling. With respect to the vertically scaled input Y luminance component (Y_Vsc), an eight tap polyphase scaling block 448 produces a horizontally scaled Y luminance component (Y_Hsc). With respect to the vertically scaled chroma component CB_Vsc, an eight tap polyphase vertical scaling block 449 produces a horizontally scaled chroma component (CB_Hsc). With respect to the vertically scaled chroma component CR_Vsc, an eight tap polyphase vertical scaling block 450 produces a horizontally scaled chroma component (CR_Hsc). The horizontally scaled texture output (Texture_Hsc) is further applied as an input to the eight tap polyphase scaling block 448, the eight tap polyphase scaling block 449 and the eight tap polyphase scaling block 450. The horizontally scaled texture output (Texture_Hsc) accordingly functions as a control signal for selecting the filter set applied by the polyphase scaling blocks 448, 449 and 450. This is discussed below in connection with FIG. 15E.

Figure 15A:
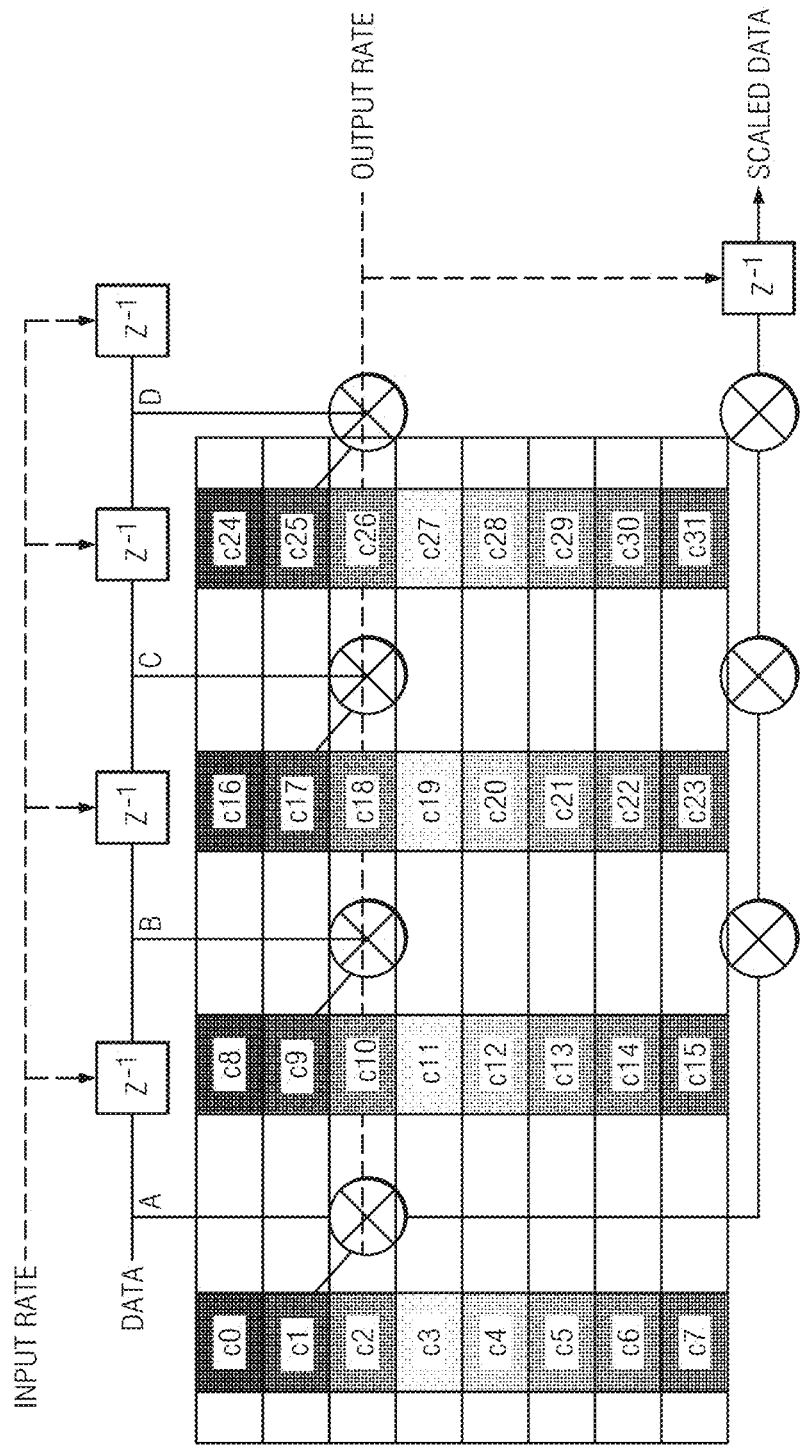

FIG. 15A shows a block diagram of a four tap eight phase polyphase FIR scaling block operable for scaling data. The tap data and coefficient selection for operation of the scaling block is shown in FIG. 15B. Implementation of such a polyphase FIR scaling block in two tap or eight tap format, as used for any of the polyphase scaling blocks in FIG. 15, is well within the capabilities of those skilled in the art. Control signal scaling can use the minimum polyphase tap requirement of two and higher taps are then used for the data path scaling.

Figure 15C:
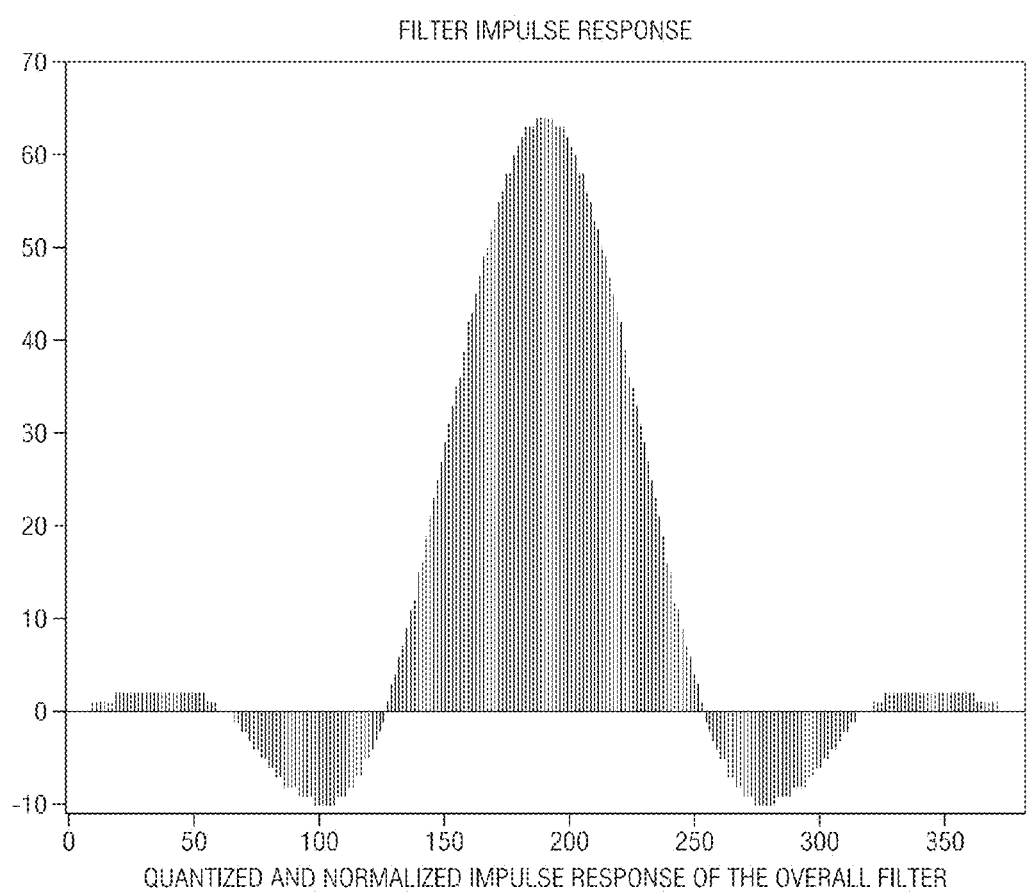
FIGS. 15C and 15D illustrate impulse response and frequency response, respectively, for an FIR filter.
Figure 15D:
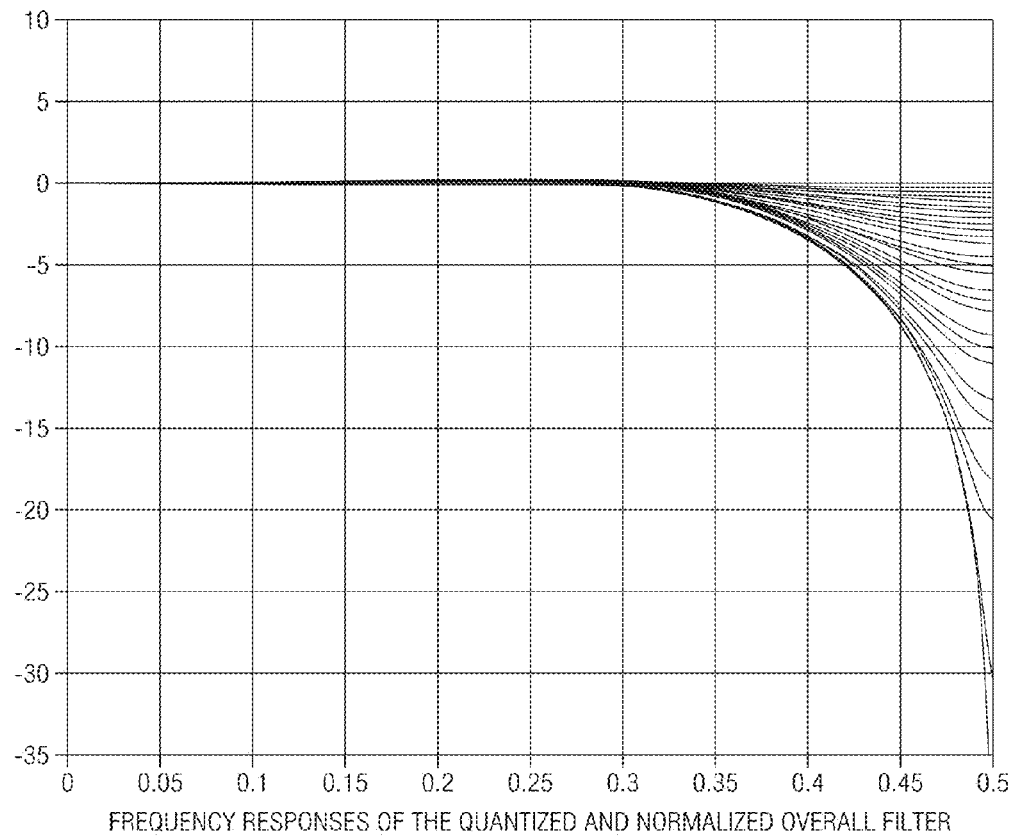

FIG. 15C shows the impulse response of the six tap 64 phase polyphase FIR filter. FIG. 15D shows the frequency response of all the 64 phases for the 6 tap 64 phase polyphase filter used in the data path scaling.

Figure 15E:
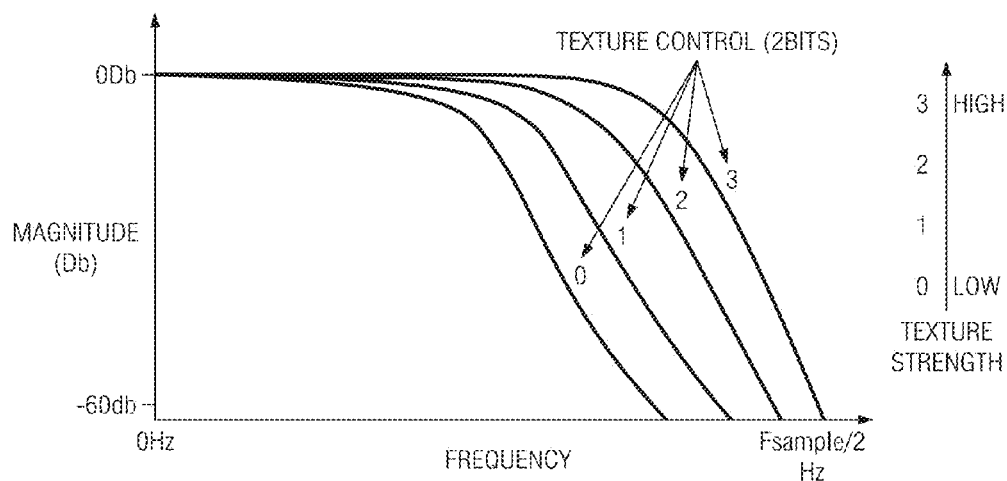
FIG. 15E illustrates control signal selection of filtering characteristics.

FIG. 15E illustrates an adaptive scaling function used during the data path scaling. The texture signal (either Texture_Vsc or Texture_Hsc) can be quantized to 2 bits or 3 bits in order to address and select a four polyphase FIR filter set or an eight polyphase FIR filter set, respectively. FIG. 15E specifically illustrates the use of a two bit quantized texture signal as a control for selecting one or four supported polyphase FIR scaling filter operations. The higher the quantized texture signal for control, the higher the selected one of the four available polyphase low-pass filter cutoffs. Conversely, the lower the quantized texture signal for control, the lower the selected one of the four available polyphase low-pass filter cutoffs. Thus, for a two bit quantized texture signal, there will be a set of four different polyphase low-pass filter characteristics with different cutoffs that need to be stored in the look-up-table. Adaptive scaling improves the texture region during scaling with the help of full bandwidth scaling FIR filter and noisy information is suppressed with the help of reduced bandwidth scaling FIR filter.

Figure 16:
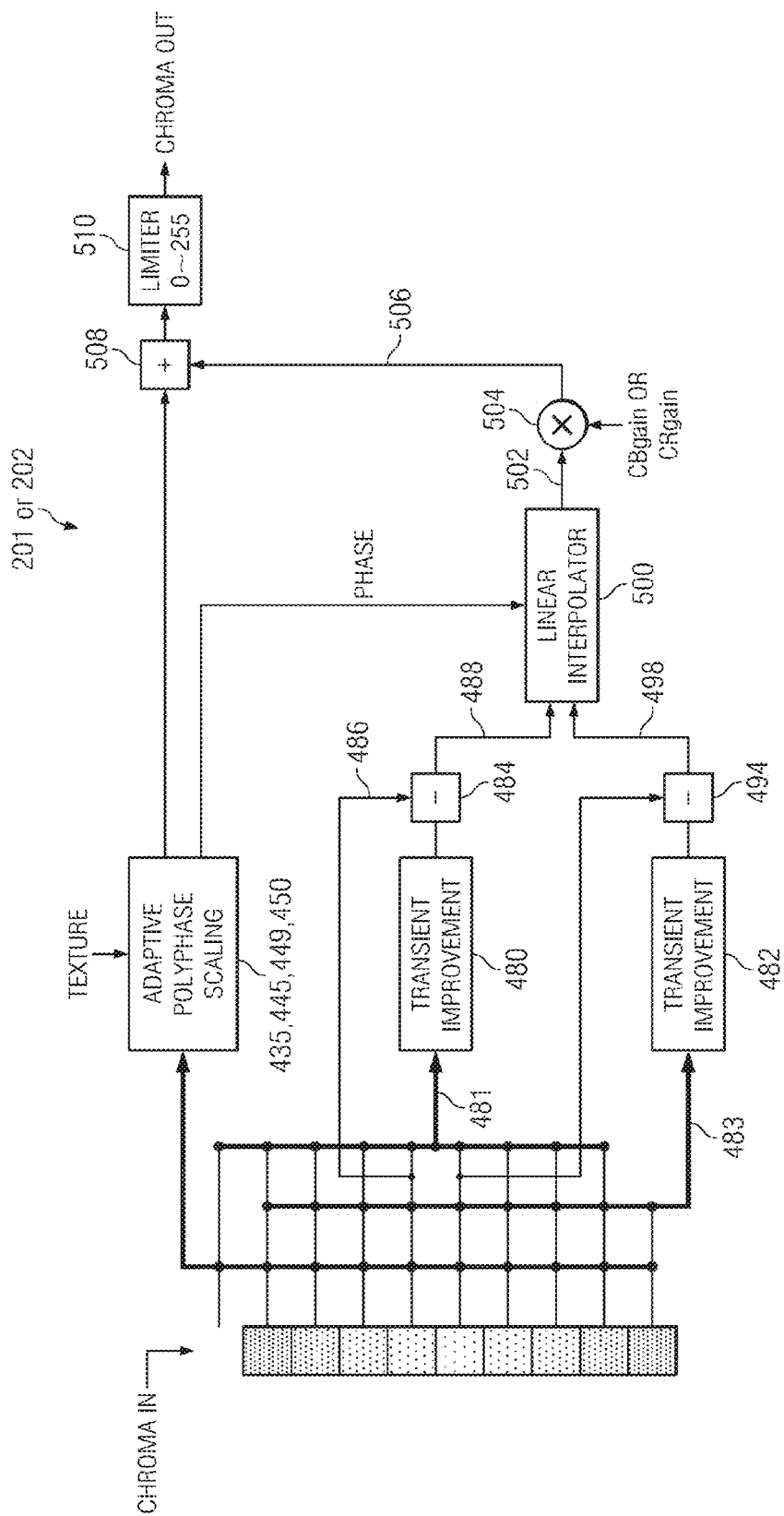
FIG. 16 illustrates a vertical/horizontal chroma processing block within the content adaptive image restoration and enhancement system of FIG. 2.

Reference is now once again made to FIG. 2. The chroma components CBin and CRin are processed in the adaptive polyphase FIR scaling with enhancement block 200 by an adaptive vertical scaling transient enhancer 201 and an adaptive horizontal scaling transient enhancer 202. A block diagram of the transient enhancer 201 or 202 is shown in FIG. 16. The chroma component (CBin or CRin) is received and processed for adaptive polyphase scaling (for example, using one of the eight tap polyphase scaling blocks 435, 445, 449 and 450). As discussed above, the polyphase scaling block receives the quantized texture signal for control selection of the polyphase low-pass filter cutoffs. In addition to outputting the vertically or horizontally scaled chroma components, the polyphase scaling block further outputs phase information. All chroma data is processed for adaptive polyphase scaling.

Both a first subset 481 of the chroma component data and a second subset 483 of the chroma component data undergo a transient improvement process in FIG. 16.

The transient improvement process functions to improve the edge transition adaptively based on edge strength. Edge strength is determined by edge width or the number of pixel forming the edge. An edge including nine pixels can be classified with an edge strength=3, an edge including seven pixels can be classified with an edge strength=2, an edge including five pixels can be classified with an edge strength=1, and an edge including three pixels can be classified with an edge strength=0.

Figure 20:
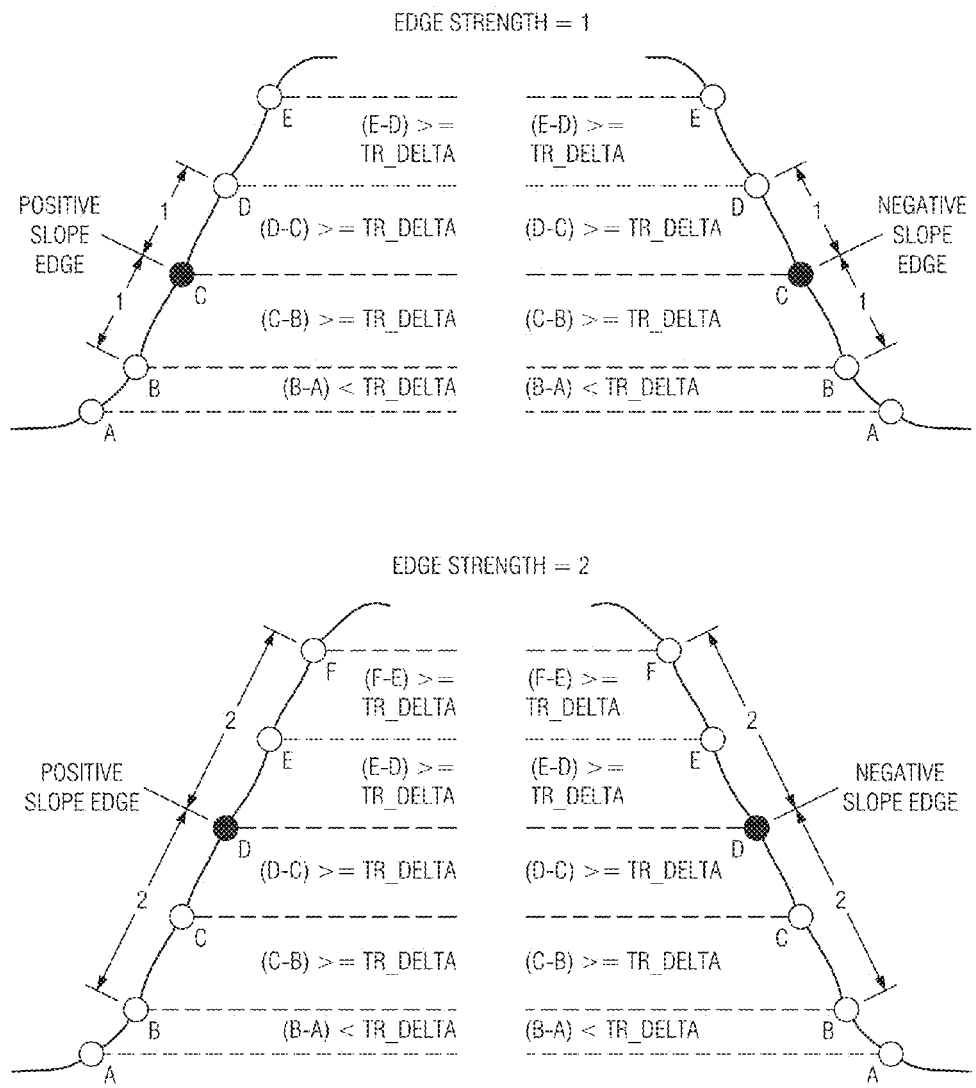
FIG. 20 illustrates an operation for edge strength determination

FIG. 20 illustrates how edge strength is determined through an analysis of edge width. Edge width is measured by detecting pixel to pixel variation within a restricted slope. Pixel to pixel slope can be varied by TR_DELTA. FIG. 20 shows this for both edge strength=1 and edge strength=2.

Figure 21A:
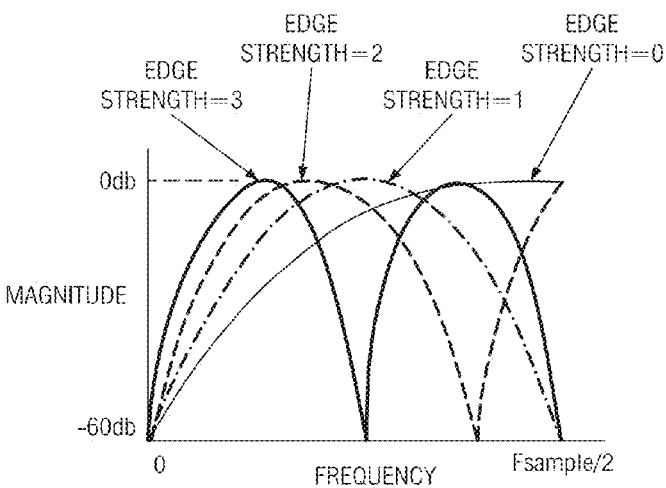
FIG. 21A illustrates an adaptive filter selection.
Figure 21B:
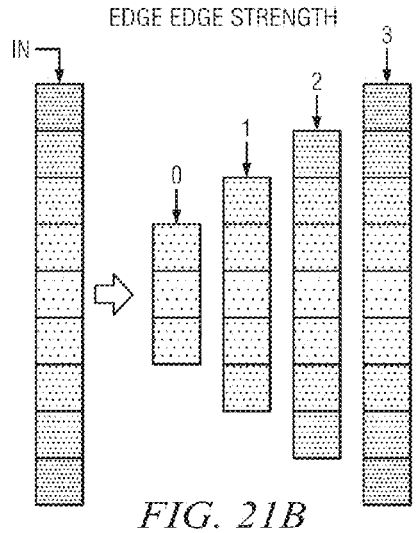
FIG. 21B illustrates an adaptive window selection.
Figure 21C:
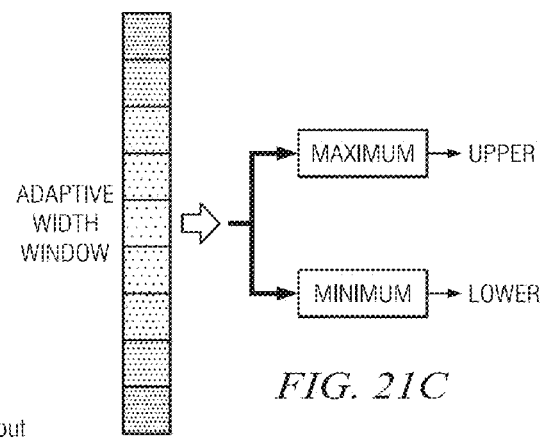
FIG. 21C illustrates a boundary measure operation.

Based on the determined edge strength, the edge transition is peaked by an FIR filter. In principle, this transition improvement converts a sine wave to a square wave by adding different harmonic frequencies. Thus, the edge adaptive filter selection logic adds respective frequency harmonics. FIG. 21a illustrates different FIR filter selections being made for different determined edge strengths. Filter peaking can be controlled by a gain lookup table which controls selection of different gain values based on the determined edge strength. Peaking is restricted within a boundary. Thus, upper and lower boundaries are derived from the data array of length equal to the edge width. Both upper and lower boundaries are derived from the adaptive window length selected by the edge strength as shown in FIG. 21b. FIG. 21c illustrates selection of the upper and lower boundaries.

Thus, the first subset 481 of the chroma component data is applied to a first transient improvement block 480. An output of the first transient improvement block 480 is applied to a summer 484 which subtracts a first chroma data value 486 to produce a first transient improvement component 488.

The second subset 483 of the chroma component data, wherein the first and second subsets are different but may overlap to some degree, is applied to a second transient improvement block 482. An output of the second transient improvement block 482 is applied to a summer 494 which subtracts a second chroma data value 496 (preferably different from the first chroma data value 486) to produce a second transient improvement component 498.

A linear interpolator block 500 receives the first transient improvement component 488 and second transient improvement component 498, performs an interpolation, and outputs an interpolated component 502. The linear interpolator block 500 further receives the phase information output from the polyphase scaling block. In this context, two tap polyphase scaling is considered as a linear interpolation. For system with a 64 phase polyphase scaling, the two tap linear interpolation is given by the following formula: Output Interpolated component=First Transient improvement component*(64-Phase)/64+Second Transient Improvement component*Phase/64. The interpolated component 502 output of the linear interpolator block 500 is multiplied 504 by a gain factor (CBgain or CRgain) to produce a gain scaled interpolated component 506. The vertically or horizontally scaled chroma component output is then summed 508 with the gain scaled interpolated component 506 and limited 510 to an 8-bit width.

Figure 17:
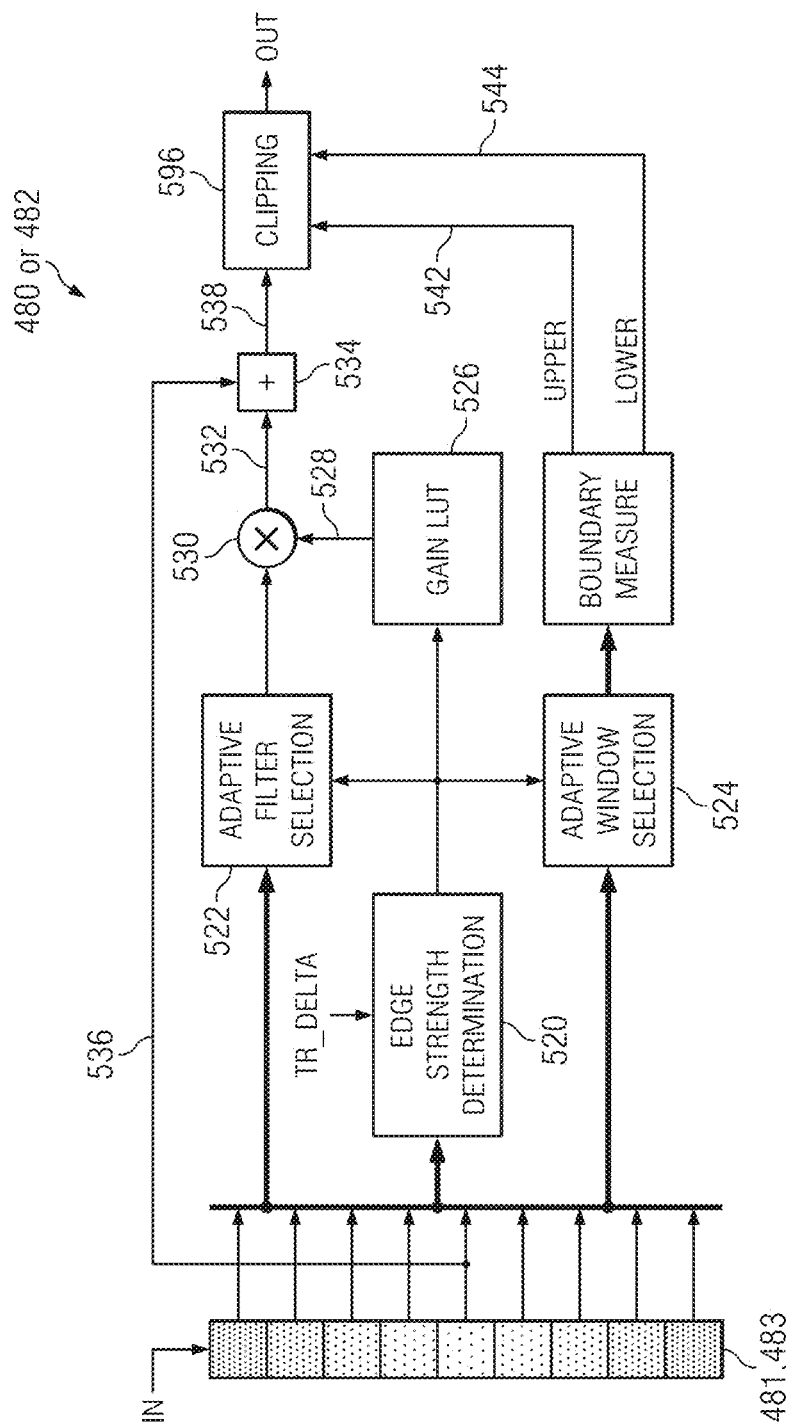
FIG. 17 illustrates a chroma transient improvement block within the vertical/horizontal chroma processing block of FIG. 16.

FIG. 17 illustrates a block diagram for the transient improvement block 480 or 482. The first or second subset 481 or 483 of the chroma component data is applied to an edge strength determination block 520. The edge strength determination block 520 further receives a control signal TR_DELTA setting the pixel to pixel slope for the edge width determination. Edge strength is determined by the same method explained in block 620, 720 and 520 with the example as shown in FIG. 20. Edge strength is determined by the length of the pixel chain formed by those pixels with intra pixel variations are unidirectional and falls within the TR_DELTA variations.

The first or second subset 481 or 483 of the chroma component data is further applied to an adaptive filter selection block 522. The adaptive filter selection block 522 further receives the output of the edge width determination block 520. The output of the edge width determination block 520 is indicative of edge strength, and the edge strength is used to control operation of the adaptive filter selection block 522 in making an FIR filter selection for application in processing the first or second subset 481 or 483.

The first or second subset 481 or 483 of the chroma component data is still further applied to an adaptive window selection block 524. Block 522 is a filter bank with different responses as shown in FIG. 21A. Block 524 is a variable data window selection as shown in FIG. 21B for the boundary measurement circuit. The adaptive window selection block 524 further receives the output of the edge width determination block 520. The output of the edge width determination block 520 is indicative of edge strength, and the edge strength is used to control operation of the adaptive window selection block 524. Depending upon the edge strength, a variable width data window segment including the center pixel is picked for boundary measurement (i.e., data window length=2*Edge Strength+1) for application in processing the first or second subset 481 or 483.

The output of the edge width determination block 520 is also applied to a gain look-up table (LUT) 526 to select a gain value 528. Again, the output of the edge width determination block 520 is indicative of edge strength, and the edge strength is used to control gain selection for the purpose of filter peaking. The output of the adaptive filter selection block 522 is multiplied 530 by the gain value 528 to produce a gain scaled output 532. The gain scaled output 532 is applied to a summer 534 which adds a chroma data value 536 (from the first or second subset 481 or 483) to produce an output 538.

The output of the adaptive window selection block 524, which is indicative of edge width, is applied to a boundary measure block 540. The boundary measure block 540 selects, in response to the output of the adaptive window selection block 524, an upper 542 and lower 544 clipping value which are applied to a clipping block 546. See, FIGS. 21b and 21c. The clipping block 546 receives the upper 542 and lower 544 clipping values, and operates to clip the output 538 from the summer 534 in accordance with the upper 542 and lower 544 clipping values to produce a transient improved chroma component for application to summer 484 or 494 in FIG. 16. The clipping operation addresses undershoot and overshoot issues which may arise from application of the gain value 528.

Reference is now once again made to FIG. 2. A conversion of the image data to the high resolution processing domain 120 is now competed. The content adaptive image restoration and enhancement system 100 further includes an adaptive post-scaled domain enhancement block 210. The scaled adaptive post-scaled domain enhancement block 210 receives the scaled texture control output (Texture_Hsc), the scaled input Y luminance component (Y_Hsc), and the scaled enhanced Y luminance component (Yenh_Hsc). Delay circuitry 457, 459 is provided to delay application of the scaled texture control output (Texture_Hsc) and scaled enhanced Y luminance component (Yenh_Hsc) to a 2D luminance transient improvement logic block 455 and an enhancer combiner block 485, respectively. The scaled adaptive post-scaled domain enhancement block 210 functions to improve the scaled texture of the received image data in the available wide bandwidth. The goal is to increase the sharpness of edges in the scaled image.

The scaled input Y luminance component (Y_Hsc) is processed by the 2D transient improvement logic block 455 as a function of the scaled texture control output (Texture_Hsc). Texture_Hsc is delayed to match the luma processing delay by the 2D LTI. Delayed Texture_Hsc control is used to modulate user gain used for the final LTI gain control 645. The output of the 2D transient improvement logic block 455 is process by the enhancer combiner block 485 as a function of the scaled enhanced Y luminance component (Yenh_Hsc) to generate the output Y luminance component (Yout).

Figure 18:
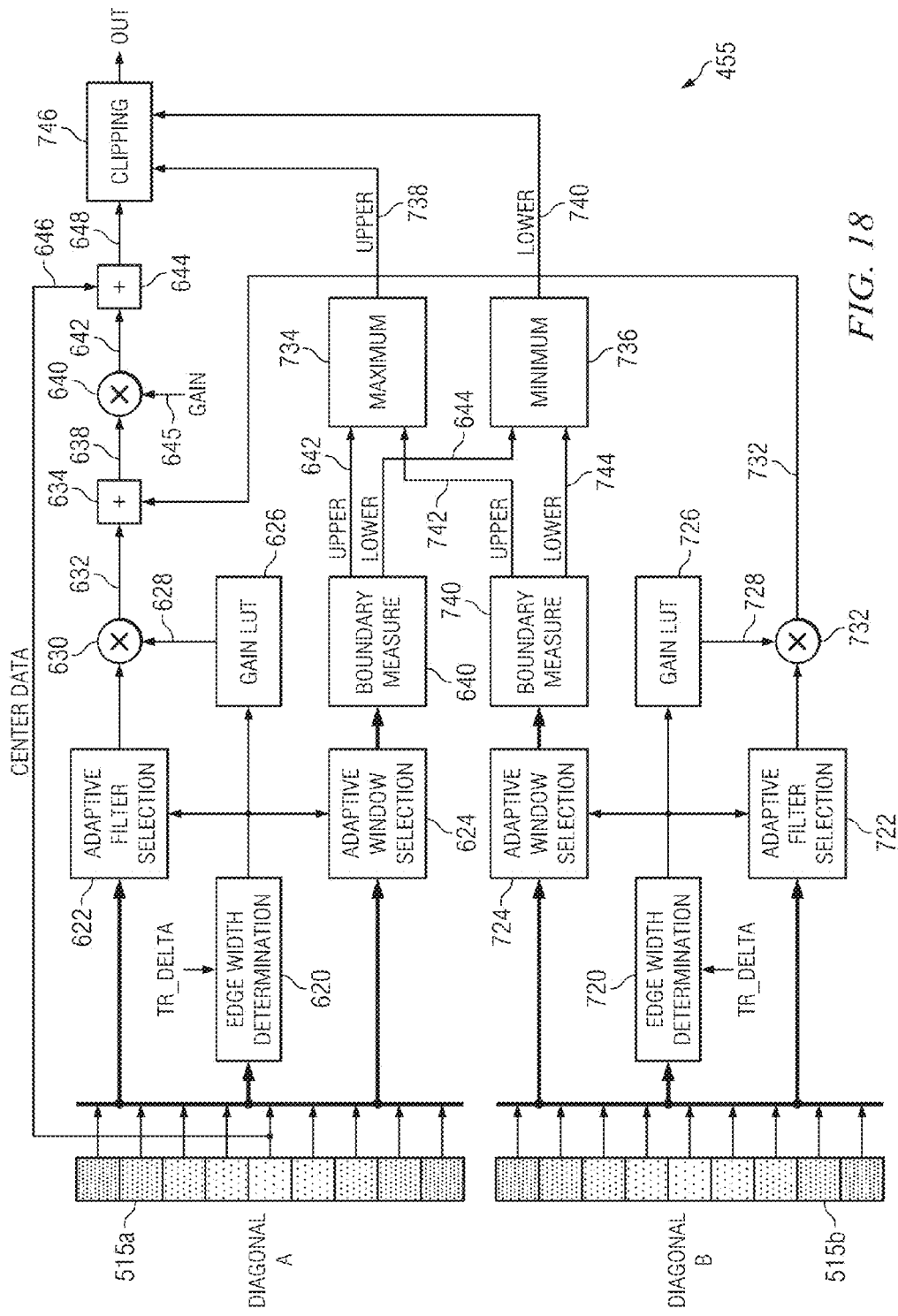
FIG. 18 is a block diagram of a 2D luminance transient improvement logic block.

Reference is now made to FIG. 18 which illustrates a block diagram of the 2D transient improvement block 455. The block 455 processes two diagonal pixel blocks, block A and block B, derived from the scaled input Y luminance component (Y_Hsc).

Figure 19:
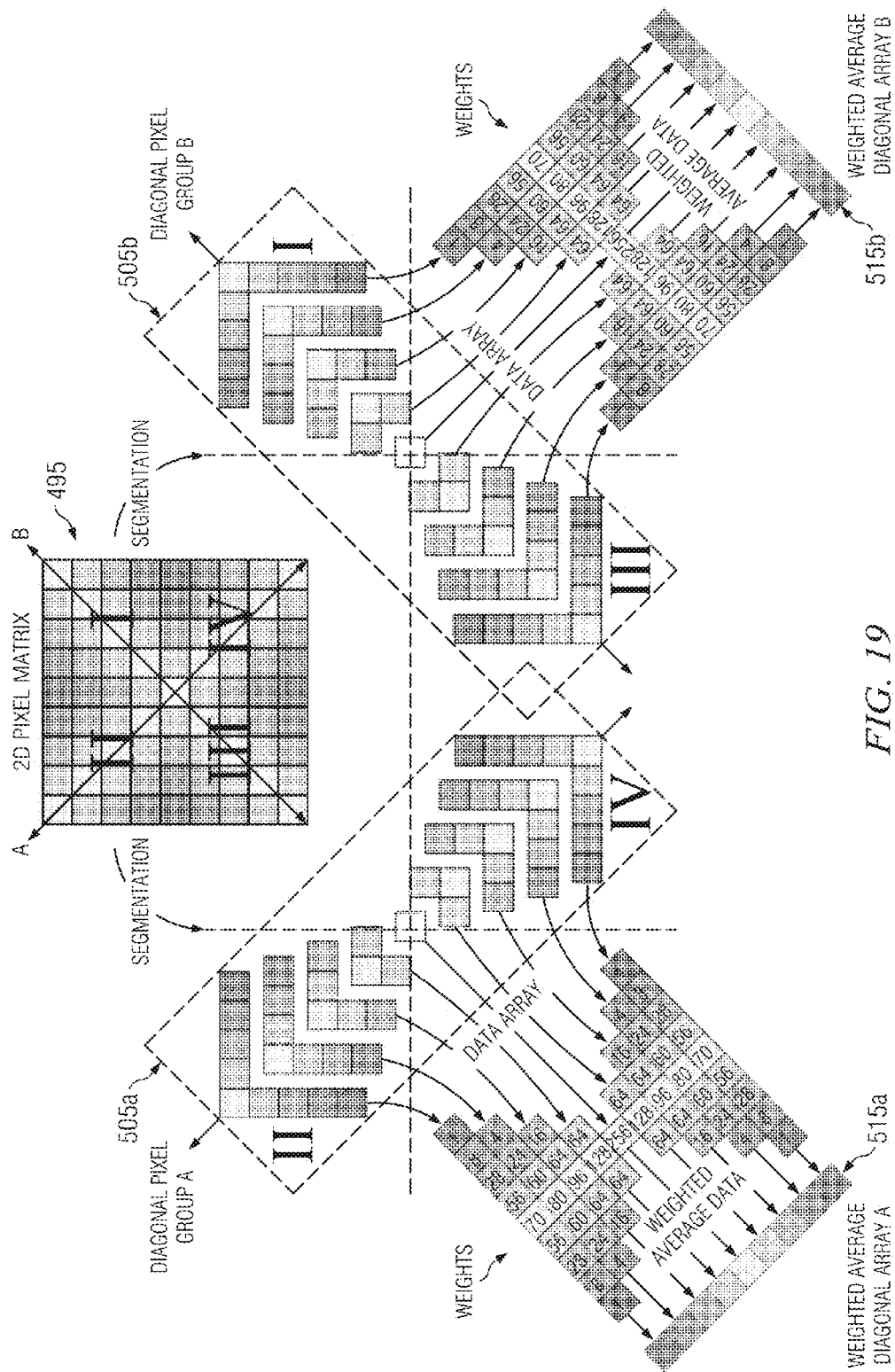
FIG. 19 illustrates a process of deriving A and B blocks from a scaled input Y luminance component.

FIG. 19 shows the process of deriving the A and B blocks from the scaled input Y luminance component (Y_Hsc) which is stored in a 2D buffer. A 2D pixel matrix 495 taken from the scaled input Y luminance component (Y_Hsc) is processed to extract the diagonal pixel groups 505a and 505b. The 2D pixel matrix 495 includes four quadrants I, II, III and IV. Diagonal A pixel group 505a includes pixels taken from quadrants II and IV. Diagonal B pixel group 505b includes pixels taken from quadrants I and III. The pixels in each group 505a and 505b are clustered as a pixel array of different length. Each array is multiplied by their set of weights and a weighted average value of each array is derived. The weighted average values for the pixel group 505a are derived and placed in a weighted average diagonal array 515a (block A). The weighted average values for the pixel group 505b are derived and placed in a weighted average diagonal B array 505b (block B). Thus, first diagonal energy extraction for the 2D matrix 495 is performed with respect to one diagonal of the 2D pixel matrix 495 and stored in the diagonal A array 515a, and another diagonal energy extraction for the 2D matrix 495 is performed with respect to the other diagonal of the 2D pixel matrix 495 and stored in the diagonal B array 515b.

Both the weighted average diagonal array 515a (block A) and the weighted average diagonal B array 505b (block B) undergo a transient improvement process in FIG. 18. The transient improvement process functions in the manner previously described in connection with FIG. 16.

With reference once again to FIG. 18 and the block diagram of the 2D transient improvement block 455, and turning first to the processing of the weighted average diagonal array 515a (block A), the data of the weighted average diagonal array 515a (block A) is applied to an edge width determination block 620. The edge width determination block 620 further receives a control signal TR_DELTA setting the pixel to pixel slope for the edge width determination. Edge strength is determined by the same method explained in block 620, 720 and 520 and shown by example in FIG. 20. Edge strength is determined by the length of the pixel chain formed by those pixels with intra pixel variations are unidirectional and falls within the TR_DELTA variations.

The data of the weighted average diagonal array 515a (block A) is further applied to an adaptive filter selection block 622. The adaptive filter selection block 622 further receives the output of the edge width determination block 620. The output of the edge width determination block 620 is indicative of edge strength, and the edge strength is used to control operation of the adaptive filter selection block 622 in making an FIR filter selection for application in processing the data of the weighted average diagonal array 515a (block A).

The data of the weighted average diagonal array 515a (block A) is still further applied to an adaptive window selection block 624. Block 622 is a filter bank with different high pass and band pass filter responses as shown in FIG. 21A. Block 624 is a variable data window selection as shown in FIG. 21B which provides inputs for the boundary measurement circuit. The adaptive window selection block 624 further receives the output of the edge width determination block 620. The output of the edge width determination block 620 is indicative of edge strength, and the edge strength is used to control operation of the adaptive window selection block 624. Depending upon the edge strength, a variable width data window segment including the center pixel is picked for boundary measurement (i.e., data window length=2*Edge Strength+1) for application in processing the data of the weighted average diagonal array 515a (block A).

The output of the edge width determination block 620 is also applied to a gain look-up table (LUT) 626 to select a gain value 628. Again, the output of the edge width determination block 620 is indicative of edge strength, and the edge strength is used to control gain selection for the purpose of filter peaking. The output of the adaptive filter selection block 622 is multiplied 630 by the gain value 628 to produce a gain scaled output 632.

The output of the adaptive window selection block 624, which is indicative of edge width, is applied to a boundary measure block 640. The boundary measure block 640 selects, in response to the output of the adaptive window selection block 624, an upper 642 and lower 644 clipping value.

Turning next to the processing of the weighted average diagonal array 515b (block B), the data of the weighted average diagonal array 515b (block B) is applied to an edge width determination block 720. The edge width determination block 720 further receives a control signal TR_DELTA setting the pixel to pixel slope for the edge width determination. Edge strength is determined by the same method explained in block 620, 720 and 520 and explained with the example shown in FIG. 20. Edge strength is determined by the length of the pixel chain formed by those pixels with intra pixel variations are unidirectional and falls within the TR_DELTA variations.

The data of the weighted average diagonal array 515b (block B) is further applied to an adaptive filter selection block 722. The adaptive filter selection block 722 further receives the output of the edge width determination block 720. The output of the edge width determination block 720 is indicative of edge strength, and the edge strength is used to control operation of the adaptive filter selection block 722 in making an FIR filter selection for application in processing the data of the weighted average diagonal array 515b (block B).

The data of the weighted average diagonal array 515b (block B) is still further applied to an adaptive window selection block 724. Block 722 is a filter bank with different high pass and band pass filter responses as shown in FIG. 21A. Block 724 is a variable data window selection as shown in FIG. 21B which provides inputs for the boundary measurement circuit. The adaptive window selection block 724 further receives the output of the edge width determination block 720. The output of the edge width determination block 720 is indicative of edge strength, and the edge strength is used to control operation of the adaptive window selection block 724. Depending upon the edge strength, a variable width data window segment including the center pixel is picked for boundary measurement (i.e., data window length=2*Edge Strength+1) for application in processing the data of the weighted average diagonal array 515b (block B).

The output of the edge width determination block 720 is also applied to a gain look-up table (LUT) 726 to select a gain value 728. Again, the output of the edge width determination block 720 is indicative of edge strength, and the edge strength is used to control gain selection for the purpose of filter peaking. The output of the adaptive filter selection block 722 is multiplied 730 by the gain value 728 to produce a gain scaled output 732.

The output of the adaptive window selection block 724, which is indicative of edge width, is applied to a boundary measure block 740. The boundary measure block 740 selects, in response to the output of the adaptive window selection block 724, an upper 742 and lower 744 clipping value.

Both the transition improvement for diagonal A and diagonal B are then combined to get a 2D luminance transient response. A summer 634 sums the gain scaled output 632 and the gain scaled output 732 to produce a summed output 638. Thus, filter peaking from diagonal array A and B are combined to get filter peaking for the entire 2D matrix 495. The combined filter output is then gain controlled. The summed output 638 is multiplied 640 by a gain value (Gain) 645 to produce a gain scaled summed output 642. Gain value 645 is derived by modulating the user control GAIN with the delayed Texture_Hsc control. The gain scaled summed output 642 is applied to a summer 644 which adds a chroma data value 646 (from the center of the weighted average diagonal array 515a (block A)) to produce an output 648.

After the filter addition, the resulting edge will show peaking. Overshoot and undershoot due to peaking needs to be clipped to get good transition improvement. Lower and upper boundary levels from Diagonal array A and B are then combined to get boundary levels for entire 2D matrix 495. The upper 642 and 742 clipping values are applied to a maximum block 734 which selects a maximum one of the upper 642 and 742 clipping values for output as an upper 738 clipping value. The lower 644 and 744 clipping values are applied to a minimum block 736 which selects a minimum one of the lower 644 and 744 clipping values for output as a lower 740 clipping value.

The upper 738 and lower 740 clipping values are applied to a clipping block 746. See, FIGS. 21b and 21c. 2D peaking for the center pixel is clipped by the upper and lower boundary values for the entire 2D matrix 495. Clipping trims the overshoot and undershoot resulted from peaking and gives our sharp transition edges. The clipping block 746 receives the upper 738 and lower 740 clipping values, and operates to clip the output 648 from the summer 644 in accordance with the upper 738 and lower 740 clipping values to produce a transient improved luminance component (Out) for application to the enhancer combiner 485 in FIG. 2. The clipping operation addresses undershoot and overshoot issues which may arise from application of the gain values 628, 728 and Gain.

Figure 22:
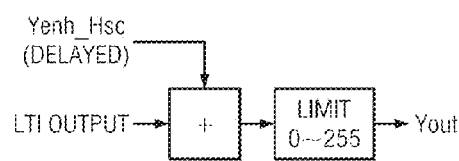
FIG. 22 illustrates a luminance processing operation.

With reference once again to FIG. 2, the enhancer combiner 485 receives the transient improved luminance component (Out) from FIG. 18 and the delayed scaled enhanced Y luminance component (Yenh_Hsc). The delayed scaled Y enhanced component out of the delay logic 457 is added with the output from the luminance transient Improvement block 455 as shown in FIG. 22. The combined luminance component is then limited with the data width range by the limiter. The resulting processed luminance component is referred as Yout.

The embodiments provide an architecture with a greater adaptability and ability in improving the resolution and quality of any low resolution low quality images. Adaptive control logic provides advantages in operation. Adaptation is provided by analyzing the input image in the pre-scaled domain by clean texture extraction and noise isolation. Texture and noise adaptive polyphase scaling, enhancements and transient improvements are performed.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. An image processing system, comprising:
a texture estimator and noise discriminator configured to receive a luminance component signal with a low resolution and comprising an image block with noise, generate a content adaptive kernel from the image block, convolve the adaptive kernel with the luminance component signal, and generate a noise signal and an extracted texture which excludes noise;
a two-dimensional adaptive sharpener configured to receive the luminance component signal and the noise signal, filter the luminance component signal with noise inhibition, and generate an enhanced luminance component signal;
a scaler configured to horizontally and vertically scale the enhanced luminance component signal, horizontally and vertically scale the extracted texture, and adaptively vertically and horizontally scale the luminance component signal as a function of the horizontally and vertically scaled extracted texture; and
an image enhancer configured to combine the horizontally and vertically scaled enhanced luminance component signal, horizontally and vertically scaled extracted texture and adaptively vertically and horizontally scaled luminance component signal to generate an output luminance component signal with a high resolution.

2. The system of claim 1, wherein the texture estimator and noise discriminator is configured to:
estimate texture validity by spatial correlation of a pixel within the block with its surrounding pixels;
measure uncorrelated pixels and variance to produce an amount of noise locally existing on the texture;
reshape a detail extraction kernel based on texture correlation to produce a content adaptive anisotropic kernel; and
filter the luminance component signal with the content adaptive anisotropic kernel to generate the extracted texture which excludes noise.

3. The system of claim 1, wherein the two-dimensional adaptive sharpener comprises:
a first filter configured to band pass filter the luminance component signal;
a second filter configured to high pass filter the luminance component signal;
a summer configured to sum the band pass filtered luminance component signal and high pass filtered luminance component signal; and
a coring circuit configured to subtract the noise signal from an output of the summer.

4. The system of claim 3, wherein the band pass filter of the first filter is a Lapacian of the content adaptive kernel and the high pass filter of the second filter is a Gaussian high-pass filter.

5. The system of claim 4, wherein the coring circuit comprises a two-dimensional sharpness filter and the noise signal is subtracted from an output of the two-dimensional sharpness filter.

6. The system of claim 3, further comprising:
a first multiplier configured to gain control the band pass filtered luminance component signal; and
a second multiplier configured to gain control the high pass filtered luminance component signal.

7. The system of claim 5, further comprising a third multiplier configured to gain control an output of the coring circuit to generate the enhanced luminance component signal.

8. The system of claim 1, wherein the texture estimator and noise discriminator is configured to:
convolve a neighborhood weighted anisotropic Gaussian mask with the luminance component signal to produce a first intermediate signal;
convolve a non-adaptive isotropic Gaussian mask with the luminance component signal to produce a second intermediate signal;
calculate a first absolute difference between the luminance component signal and the first intermediate signal to generate the noise signal; and calculate a second absolute difference between the luminance component signal and the second intermediate signal to generate the extracted texture which excludes noise.

9. The system of claim 8, further comprising:
a first multiplier configured to gain control the noise signal; and
a second multiplier configured to gain control the extracted texture which excludes noise.

10. The system of claim 1, wherein the input luminance component is scaled with a polyphase multirate low pass filter configured to convert the luminance component to a high resolution luminance scaled output.

11. The system of claim 10, wherein the polyphase multirate low pass filter is selected adaptively by a scaled texture control so as to effectively scale texture information with a higher filter cutoff and scale non texture information with a lower filter cutoff.

12. The system of claim 1, further comprising a polyphase multirate low pass filter configured to receive chroma information, the polyphase multirate low pass filter configured to convert the chroma information into a high resolution chroma scaled output.

13. The system of claim 12, wherein the polyphase multirate low pass filter is selected adaptively by a scaled texture control so as to effectively scale texture information with a higher filter cutoff and scale non texture information with a lower filter cutoff.

14. The system of claim 12, further comprising chroma transient improvement logic configured to perform transition slope improvement on the chroma information.

15. The system of claim 14, wherein the chroma transient improvement logic produces first and second outputs, further comprising a bilinear interpolation circuit configured to receive the first and second outputs and match with adaptively scaled chroma data.

16. The system of claim 1, wherein the image enhancer comprises:
a two-dimensional luminance transient improver configured to receive the adaptively vertically and horizontally scaled luminance component signal and generate a luminance improved signal as a function of the horizontally and vertically scaled extracted texture; and
an enhancer configured to sum the luminance improved signal with the horizontally and vertically scaled enhanced luminance component signal to generate the output luminance component signal with a high resolution.

17. The system of claim 16, wherein the two-dimensional luminance transient improver is configured to:
calculate a first pixel diagonal from the adaptively vertically and horizontally scaled luminance component signal;
calculate a second pixel diagonal from the adaptively vertically and horizontally scaled luminance component signal;
adaptively filter the first pixel diagonal; and
adaptively filter the second pixel diagonal; and
sum the adaptively filtered first and second pixel diagonals to produce the luminance improved signal.

18. The system of claim 17, wherein the two-dimensional luminance transient improver is further configured to clip the luminance improved signal as a function of the first and second pixel diagonals.

19. The system of claim 18, wherein the clip of the luminance improved signal is made in response to an upper limit and lower limit calculated from a boundary measure of the first and second pixel diagonals.

20. The system of claim 19, wherein the two-dimensional luminance transient improver is further configured to determine an edge strength in the first and second pixel diagonals, said edge strength adaptively controlling a window selection for making the boundary measure of the first and second pixel diagonals.

21. The system of claim 17, wherein the two-dimensional luminance transient improver is further configured to determine an edge strength in the first and second pixel diagonals, said edge strength adaptively controlling the adaptive filtering of the first and second pixel diagonals.

* * * * *